United States Patent
Ogawa

(10) Patent No.: US 7,680,573 B2
(45) Date of Patent: Mar. 16, 2010

(54) SUSPENSION CONTROL SYSTEM AND SUSPENSION CONTROL METHOD FOR VEHICLE

(75) Inventor: Fumiharu Ogawa, Okazaki (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 12/414,131

(22) Filed: Mar. 30, 2009

(65) Prior Publication Data

US 2009/0187310 A1    Jul. 23, 2009

Related U.S. Application Data

(62) Division of application No. 10/926,394, filed on Aug. 26, 2004, now abandoned.

(30) Foreign Application Priority Data

Sep. 26, 2003    (JP)    ............................. 2003-336127

(51) Int. Cl.
*B60G 17/18* (2006.01)
(52) U.S. Cl. .............................. 701/37; 701/38; 701/39; 180/337; 280/5.5; 280/788; 267/2
(58) Field of Classification Search ............. 701/37–39; 180/337, 282; 280/5.508, 788; 267/2
See application file for complete search history.

(56) References Cited

U.S. PATENT DOCUMENTS

| | | | | |
|---|---|---|---|---|
| 4,797,823 | A | * | 1/1989 | Ikemoto et al. ................ 701/38 |
| 4,807,128 | A | * | 2/1989 | Ikemoto et al. ................ 701/38 |
| 5,315,295 | A | | 5/1994 | Fujii et al. |
| 5,369,584 | A | | 11/1994 | Kajiwara et al. |
| 6,009,374 | A | | 12/1999 | Urahashi et al. |
| 6,199,001 | B1 | | 3/2001 | Ohta et al. |
| 7,168,709 | B2 | | 1/2007 | Niwa et al. |
| 2005/0090956 | A1 | * | 4/2005 | Ogawa ......................... 701/37 |
| 2007/0067080 | A1 | * | 3/2007 | Messih et al. .................. 701/37 |
| 2009/0187310 | A1 | * | 7/2009 | Ogawa ......................... 701/38 |

FOREIGN PATENT DOCUMENTS

| | | |
|---|---|---|
| DE | 10060536 | 6/2002 |
| EP | 1288887 | 3/2003 |
| JP | 60-235662 | * 10/1985 |

(Continued)

OTHER PUBLICATIONS

New Automotive Sensors—A Review; Fleming, W.J.; Sensors Journal, IEEE; vol. 8, Issue 11, Nov. 2008 pp. 1900-1921; Digital Object Identifier 10.1109/JSEN.2008.2006452.*

(Continued)

*Primary Examiner*—Cuong H Nguyen
(74) *Attorney, Agent, or Firm*—Bacon & Thomas, PLLC

(57) ABSTRACT

A suspension control system and a suspension control method for a vehicle control the suspension based on the condition of the road surface traveled by the vehicle in addition to information pertaining to a corner obtained from a navigation device when the vehicle approaches the corner. A microprocessor controls damping forces of suspension devices on the basis of a degree of irregularity of the road surface detected immediately preceding entry of the automobile into a turn around the corner, and corner information from the navigation device.

4 Claims, 16 Drawing Sheets

FOREIGN PATENT DOCUMENTS

| | | | |
|---|---|---|---|
| JP | 60-235663 | * | 10/1985 |
| JP | 61-36705 | * | 2/1986 |
| JP | 2719728 | | 1/1992 |
| JP | 05-345509 | | 12/1993 |
| JP | 07-156628 | | 6/1995 |
| JP | 09-114367 | | 5/1997 |
| JP | 11-115441 | | 4/1999 |
| JP | 2000-322695 | | 11/2000 |
| JP | 2003-346000 | * | 10/2003 |

OTHER PUBLICATIONS

Unscented Kalman filter for real-time vehicle lateral tire forces and sideslip angle estimation; Doumiati, M.; Victorino, A.; Charara, A.; Lechner, D.; Intelligent Vehicles Symposium, 2009 IEEE; Jun. 3-5, 2009 pp. 901-906; Digital Object Identifier 10.1109/IVS.2009.5164399.*

Virtual sensors, application to vehicle tire-road normal forces for road safety; Doumiati, M.; Victorino, A.; Charara, A.; Lechner, D.; American Control Conference, 2009. ACC '09.; Jun. 10-12, 2009 pp. 3337-3343; Digital Object Identifier 10.1109/ACC.2009.5159866.*

Linear observers for vehicle sideslip angle : experimental validation; Stephant, J.; Charara, A.; Meizel, D.; Industrial Electronics, 2004 IEEE International Symposium on; vol. 1, May 4-7, 2004 pp. 341-346 vol. 1; Digital Object Identifier 10.1109/ISIE.2004.1571831.*

Experimental validation of vehicle sideslip angle observers; Stephant, J.; Charara, A.; Meizel, D.; Intelligent Vehicles Symposium, 2004 IEEE; Jun. 14-17, 2004 pp. 150-155; Digital Object Identifier 10.1109/IVS.2004.1336372.*

Active shimmy damping using fuzzy adaptive output feedback control; Pouly, G.; Huynh, T.-H.; Lauffenburger, J.-P.; Basset, M.; Control, Automation, Robotics and Vision, 2008. ICARCV 2008. 10th International Conference on; Dec. 17-20, 2008 pp. 16-22; Digital Object Identifier 10.1109/ICARCV.2008.4795485.*

Unknown input observation via sliding modes : application to vehicle contact forces; Khemoudj, O.; Imine, H.; Djemai, M.; Control Applications, 2009. CCA '09. IEEE International Conference on; Jul. 8-10, 2009 pp. 1720-1725 ; Digital Object Identifier 10.1109/CCA.2009.5280715.*

The Research of Double-Driven Electric Vehicle Stability Control System; Junwei Li; Huafang Yang; Measuring Technology and Mechatronics Automation, 2009. ICMTMA '09. International Conference on; vol. 1, Apr. 11-12, 2009 pp. 905-909 Digital Object Identifier 10.1109/ICMTMA.2009.351.*

Development of four-wheel-type mobile robot for rough terrain and verification of its fundamental capability of moving on rough terrain; Nakajima, S.; Robotics and Biomimetics, 2008. ROBIO 2008. IEEE International Conference on; Feb. 22-25, 2009 pp. 1968-1973 ; Digital Object Identifier 10.1109/ROBIO.2009.4913302.*

* cited by examiner

US 7,680,573 B2

SUSPENSION CONTROL SYSTEM AND SUSPENSION CONTROL METHOD FOR VEHICLE

CROSS-REFERENCE TO RELATED APPLICATION

This application is a divisional of U.S. Ser. No. 10/926,394 filed on Aug. 26, 2004 and claims, under 35 USC 119, priority of Japanese Patent Application No. 2003-336127 filed on Sep. 26, 2003, the teachings of which are incorporated by reference herein, in their entirety, including the specification, drawings and abstract. application U.S. Ser. No. 10/926,338 in the name of Fumiharu OGAWA as inventor, entitled "VEHICLE SUSPENSION CONTROL SYSTEM AND SUSPENSION CONTROL METHOD" and filed Aug. 26, 2004, now abandoned, discloses and claims related subject matter.

BACKGROUND OF THE INVENTION

1. Field of the Invention

The present invention relates to a suspension control system and to a suspension control method for a vehicle.

2. Description of the Related Art

JP-A-9-114367 discloses a suspension control system in which the suspension is adjusted in advance, for example, just before the vehicle starts to turn a corner in traveling a predetermined route, on the basis of the speed of the vehicle and corner information obtained from a navigation device within the vehicle.

However in the suspension control system of JP-A-9-114367, the corner information obtained from the navigation device includes no information relative to the state of the road surface at the corner. Accordingly, for example, when the road surface at the corner is irregular and/or slippery, steering during travel of the vehicle around the corner may become unstable and the driver may feel riding discomfort (an unpleasant sensation).

SUMMARY OF THE INVENTION

Therefore, in order to overcome the above problem, an object of the present invention is to provide a suspension control system and a suspension control method for a vehicle in which the operation of a suspension means in running the vehicle is controlled by also taking into consideration the state of the road surface traveled by the vehicle, in addition to the information relative to the corner from the navigation device when the vehicle approaches the corner.

In order to achieve the above objective, in a first aspect, the present invention provides a suspension control system which includes:

suspension means (S1 to S4) interposed and mounted between a suspension arm (R1, R2) and the body (B) of the vehicle mounting a navigation device (N), and operated in accordance with a controlled damping force;

irregular state detecting means (41a to 41d) for detecting the degree of irregularity of a road surface on which the vehicle is running;

vehicle speed detecting means (30b) for detecting the running speed of the vehicle as a vehicle speed;

calculating means (132, 133 to 137, 141, 142, 144, 145) for calculating an adjustment value corresponding to the damping force of the suspension means on the basis of the detected vehicle speed (V), the detected degree of irregularity and information relative to a corner (T) from the navigation device, when the vehicle approaches the corner (T) during travel; and output means (150, 60a to 60d) for outputting the above adjustment value to the suspension means so as to control the damping force of the suspension means in accordance with the calculated adjustment value.

Thus, when the vehicle approaches the corner, an adjustment value corresponding to a desirable damping force of the suspension means is calculated on the basis of the detected vehicle speed, the detected irregularity and the information relative to the corner from the navigation device. The adjustment value is output to the suspension means so as to control the damping force of the suspension means by the adjustment value.

Accordingly, a good ride sensation (riding comfort of the passengers) and good steering stability during the running of the vehicle can be maintained even when there are irregularities in the road surface approaching and/or in the corner.

In accordance with a second aspect of the invention, the suspension control system may further include:

turning detecting means (42) for detecting turning of the vehicle; and entry judging means (146) for judging whether or not the vehicle has entered into a turn around the corner, on the basis of the detected turning of the vehicle; and wherein the output means outputs the above adjustment value to the suspension means so as to control its damping force in accordance with the adjustment value from the calculating means and in accordance with the judgment of the entry judging means.

In accordance with a third aspect of the present invention, the calculating means preferably extracts an irregularity component corresponding to a predetermined frequency from the degree of irregularity detected by the irregular state detecting means, and calculates the adjustment value corresponding to the damping force of the suspension means on the basis of the irregularity component extracted in this way. The operating advantages of the invention previously described can be further improved by calculating the adjustment value in this manner.

In accordance with a fourth aspect of the invention, the calculating means stops the calculation of the adjustment value responsive to a determination by the entry judging means that the vehicle has started the turn around the corner, and the calculating means reports the adjustment value at this point in time (start of turn) as the adjustment value for the damping force of the suspension means to be used for turning the corner.

In accordance with a fifth aspect of the invention, the suspension control system for a vehicle in the present invention comprises:

suspension means (S1 to S4) interposed and mounted between a suspension arm (R1, R2) and the body (B) of the vehicle mounting a navigation device (N), and operated in accordance with a controlled damping force;

slip state detecting means (43a, 43b) for detecting the slip state of a road surface at the present location (position) of the vehicle;

vehicle speed detecting means (30b) for detecting the running speed of the vehicle as a vehicle speed;

calculating means (132a, 133a to 137a, 141, 142, 144, 145a) for calculating an adjustment value (amount) corresponding to a preferred level of damping force of the suspension means on the basis of the detected vehicle speed (V), the detected slip state and information relative to a corner (T) from the navigation device, when the vehicle approaches the corner (T) during travel; and output means (150, 60a to 60d) for outputting the adjustment value to the suspension means so as to control the damping force of the suspension means in accordance with the calculated adjustment value.

Thus, when the vehicle approaches a corner during travel, the adjustment value corresponding to the damping force of the suspension means is calculated on the basis of the detected vehicle speed, the detected slip state and the information relative to the corner from the navigation device. The above adjustment value is output to the suspension means so as to control the damping force of the suspension means in accordance with the calculated adjustment value.

Accordingly, riding comfort and stability during travel can be maintained in a preferred manner even when the road surface state approaching the corner and the road surface within the corner are slippery.

Further, in accordance with a sixth aspect of the invention, the suspension control system of the fifth aspect further comprises:

turning detecting means (42) for detecting turning of the vehicle;

entry judging means (146) for determining whether or not the vehicle has entered into the turn around the corner on the basis of the determination made by the detecting means; and wherein the output means outputs the adjustment value to the suspension means so as to control the damping force of the suspension means in accordance with adjustment value and in accordance with the determination of the entry judging means that the vehicle has entered into the turn around the corner.

Further, in accordance with another aspect of the invention, the calculating means determines a predetermined slip state based on the slip state detected by the slip state detecting means, and calculates the adjustment value corresponding to the damping force of the suspension means on the basis of the slip state.

In another embodiment, the calculating means calculates an adjustment value corresponding to damping force of the suspension means on the basis of both the state of the road surface detected for the present position of the vehicle and information relative to the corner which is output from the navigation device, and the damping force of the suspension means during travel of the vehicle is controlled in accordance with this calculated adjustment value.

DESCRIPTION OF THE PREFERRED EMBODIMENTS

Preferred embodiments of the present invention will next be explained with reference to the drawings.

First Embodiment

Figure 1:
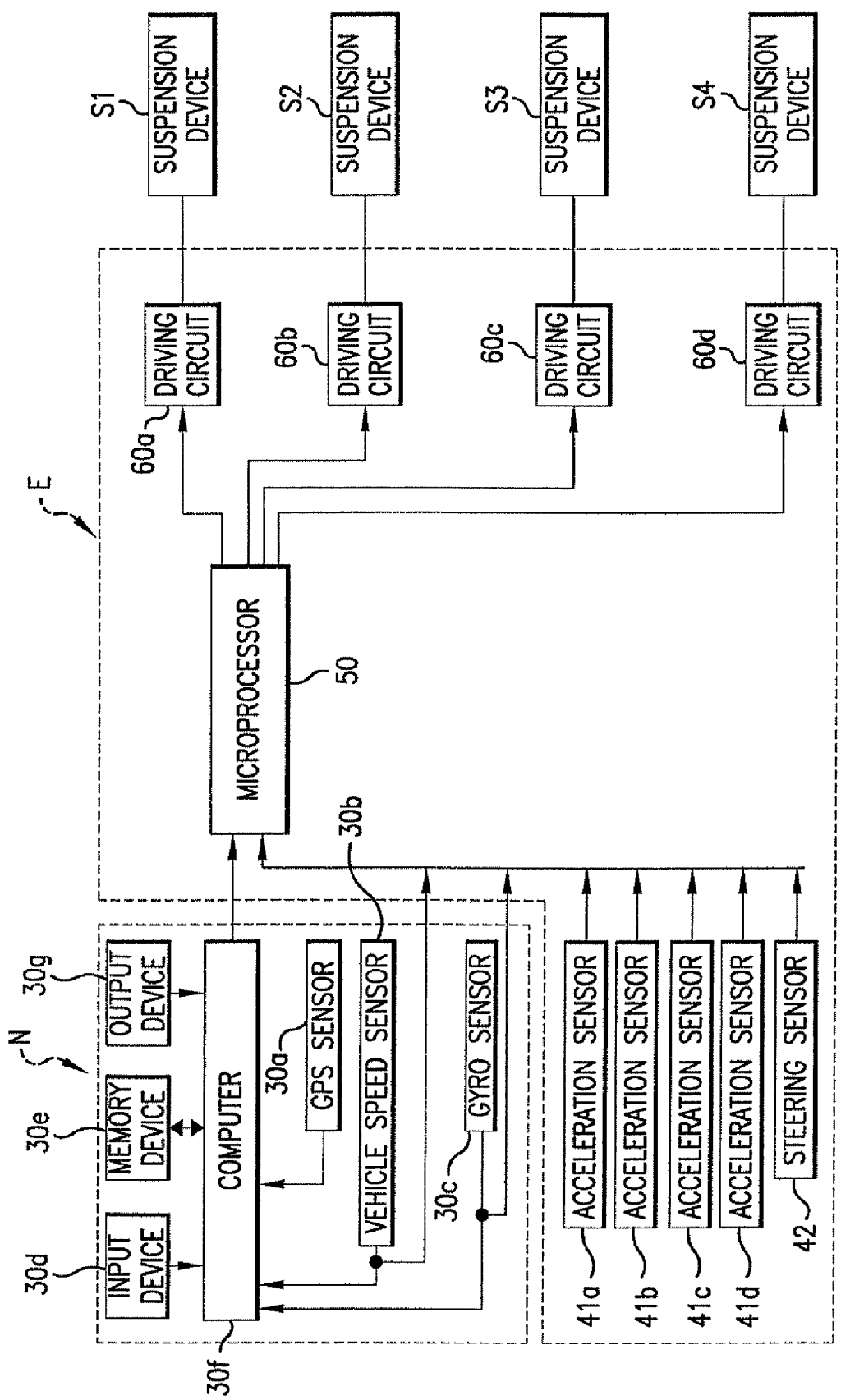
FIG. 1 is a block diagram of a first embodiment of a suspension control system for an automobile in accordance with the present invention.

FIG. 1 shows a first embodiment of a suspension control system of the present invention, designed for a sedan type automobile and including suspension devices S1 to S4 and an electronic controller E.

Figure 2:
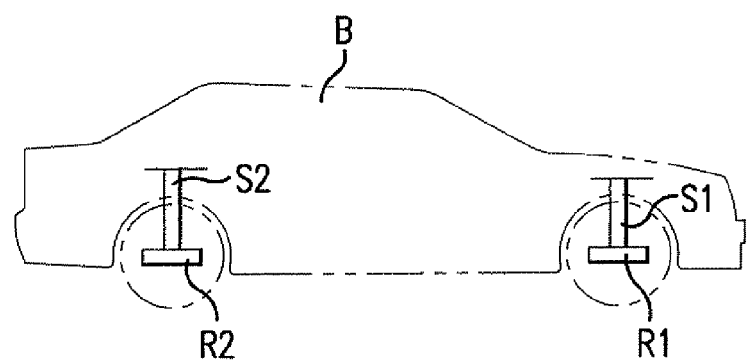
FIG. 2 is a schematic view showing arrangement of suspension devices in the automobile.

As shown in FIG. 2, the suspension device S1 is interposed and mounted between a wheel support element R1 supporting the right-hand side front wheel of the automobile, and the right-hand side front portion of the vehicle frame B.

Figure 3:
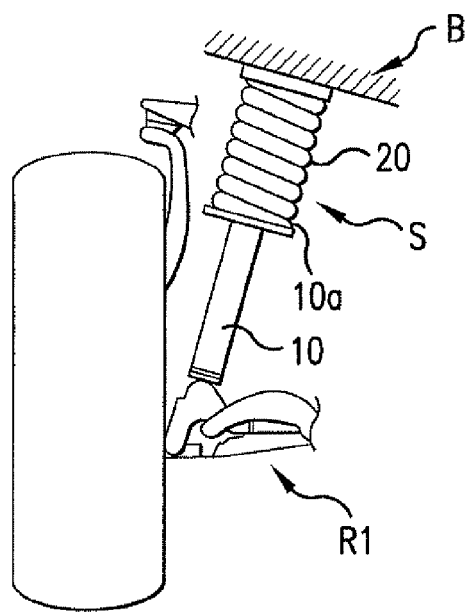
FIG. 3 is an enlarged side view of one suspension device of FIG. 2.

As shown in FIG. 3, this suspension device S1 has a damper 10 and a coil spring 20. The lower end portion of damper 10 is supported on the wheel support element. The wheel support element, to which the lower end of the shock absorber attaches, may be different for front and rear wheels and for different vehicles, e.g., axle housing, lower suspension arm, steering knuckle, bearing housing or motor housing. The coil spring 20 is coaxially mounted on the damper 10, external thereto, between a flange 10a arranged in an axially intermediate location on the damper 10 and the vehicle frame B. Thus, the coil spring 20 biases upward the front right-hand side of the vehicle frame B.

Figure 4:
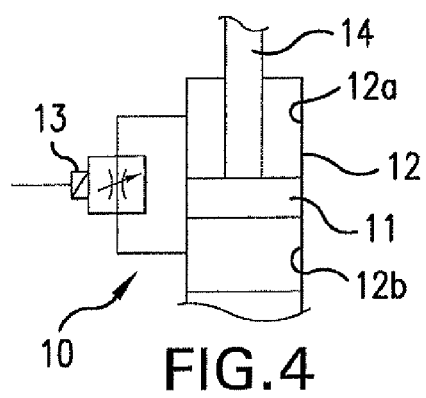
FIG. 4 is a schematic view of a circuit of the suspension device.

The construction and function of the damper 10 is illustrated by the equivalent circuit shown in FIG. 4 which shows the damper 10 as including a piston 11 and a hydraulic cylinder 12. The piston 11 is slidably fitted and mounted within the cylinder 12, and partitions the interior of the cylinder 12 into upper and lower hydraulic compartments 12a, 12b.

Further, the damper 10 has an electromagnetic diaphragm valve 13 which provides communication between hydraulic compartments 12a and 12b through its diaphragm aperture. A piston rod 14 extends from the piston 11 through the hydraulic compartment 12a and its upper end is connected to the vehicle body B at the right-hand side front wheel corresponding part.

As the piston 11 slides upward within the damper 10, operating oil within the hydraulic compartment 12a flows into the hydraulic compartment 12b through the electromagnetic diaphragm valve 13. Likewise, as the piston 11 slides downward, the operating oil within the hydraulic compartment 12b flows into the hydraulic compartment 12a through the electromagnetic diaphragm valve 13. In this embodiment, the electromagnetic diaphragm valve 13 adjusts the amount of flow of the operating oil between the hydraulic compartments 12a and 12b, in accordance with its diaphragm aperture which is reduced (or increased) in accordance with an increase (or decrease) corresponding to the damping force of the damper 10, i.e., the damping force of the suspension device S1.

Likewise, the suspension device S2 is interposed and mounted between a wheel support element R2, arranged near the right-hand side rear wheel of the automobile, and the corresponding part (hereinafter also called the right-hand side rear wheel corresponding part) of the vehicle frame B. The suspension device S3 (see FIG. 1) is interposed and mounted between an unillustrated wheel support element, supporting the left-hand side front wheel of the automobile and the corresponding part of the vehicle frame B. Further, the suspension device S4 (see FIG. 1) is interposed and mounted between an unillustrated wheel support element supporting the left-hand side rear wheel of the automobile and the corresponding part of the vehicle frame B.

Similar to the suspension device S1, each of these suspension devices S2 to S4 has a damper 10 and coil spring 20 and each functions in a manner similar to suspension device S1.

The front wheels of the automobile serve as the drive wheels.

The electronic controller E will next be explained in relation to navigation device N with reference to FIG. 1. The navigation device N includes a GPS sensor 30a, a vehicle speed sensor 30b and a gyro sensor 30c. The GPS sensor 30a detects the present position of the automobile on the basis of respective radio signals from plural geostationary satellites. The vehicle speed sensor 30b detects the running speed of the automobile as a vehicle speed. The gyro sensor 30c detects an angle of rotation of the automobile around a vertical axis passing through the center of gravity of the automobile.

Further, the navigation device N has an input device 30d, a memory device 30e, a computer 30f and an output device 30g. The input device 30d is used to input necessary information to the computer 30f. A series of map data is stored to the memory device 30e as a database so as to be read by the computer 30f.

Figure 5:
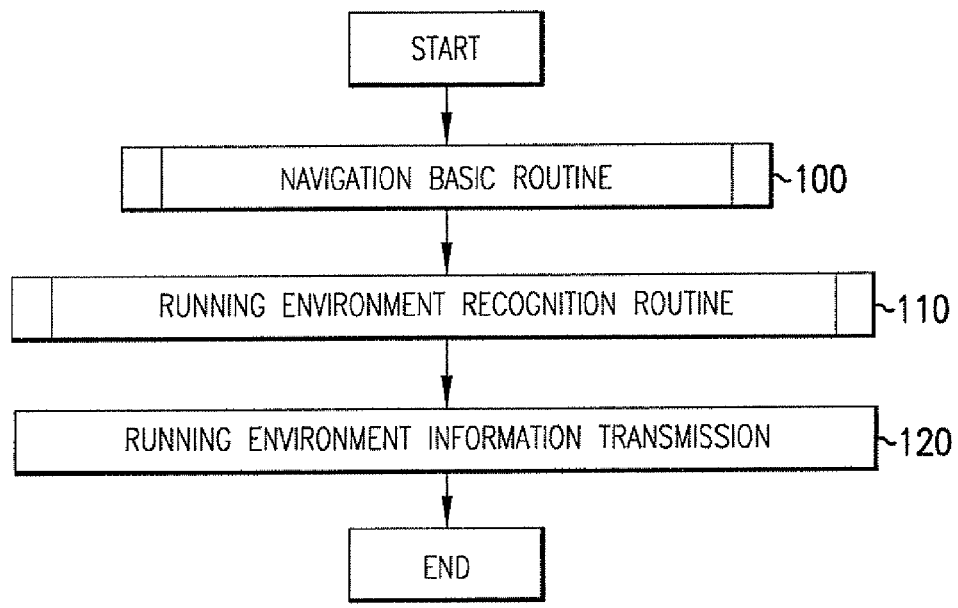
FIG. 5 is a flow chart of a navigation control program executed by a computer of the navigation device of FIG. 1.
Figure 6:
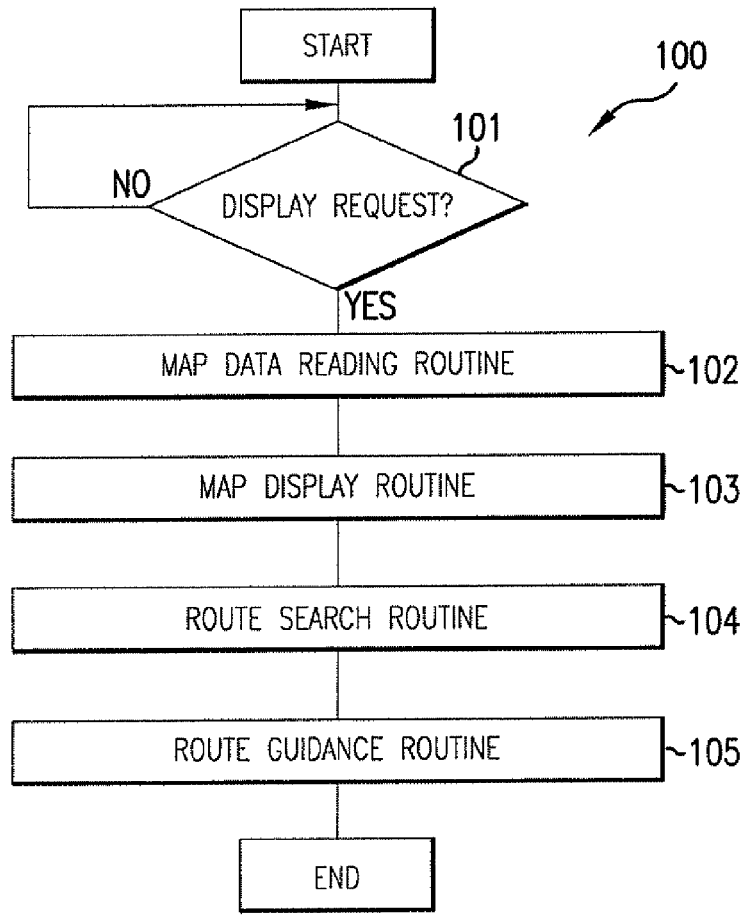
FIG. 6 is a detailed flow chart of the basic navigation routine (step 100 in FIG. 5).
Figure 7:
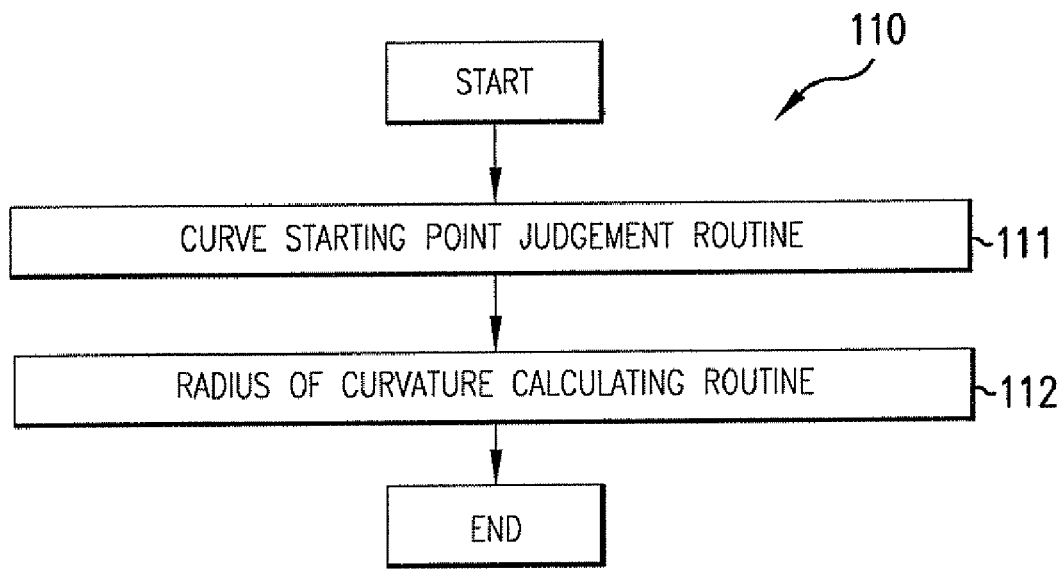
FIG. 7 is a flow chart of the running environment recognition routine (step 110 in FIG. 5).

The computer 30f executes a navigation control program in accordance with the flow charts shown in FIGS. 5 to 7. The computer 30f executes routines required for guidance of the automobile (navigation control program) on the basis of the input from the input device 30d, the data stored in the memory device 30e and each of the outputs of the GPS sensor 30a and the vehicle speed sensor 30b. The output device 30g displays data required as information in the automobile, under control of the computer 30f.

As shown in FIG. 1, the electronic controller B has respective acceleration sensors 41a to 41d, a steering sensor 42, a microprocessor 50 and respective driving circuits 60a to 60d.

Each of the acceleration sensors 41a to 41d is arranged in the vehicle body B adjacent respective suspension devices S1 to S4. Each of these acceleration sensors 41a to 41d detects vertical acceleration of the automobile. The steering sensor 42 detects a steering angle relative to a neutral position of the steering wheel of the automobile.

Figure 8:
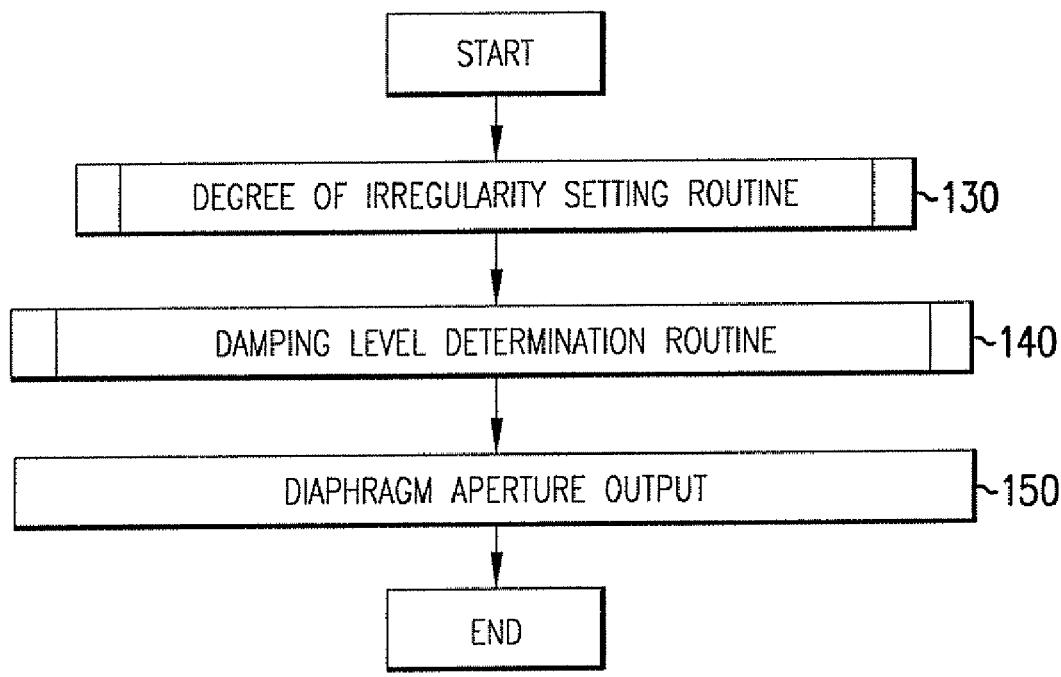
FIG. 8 is a flow chart of a suspension control program executed by the microprocessor of the electronic controller in FIG. 1.
Figure 9:
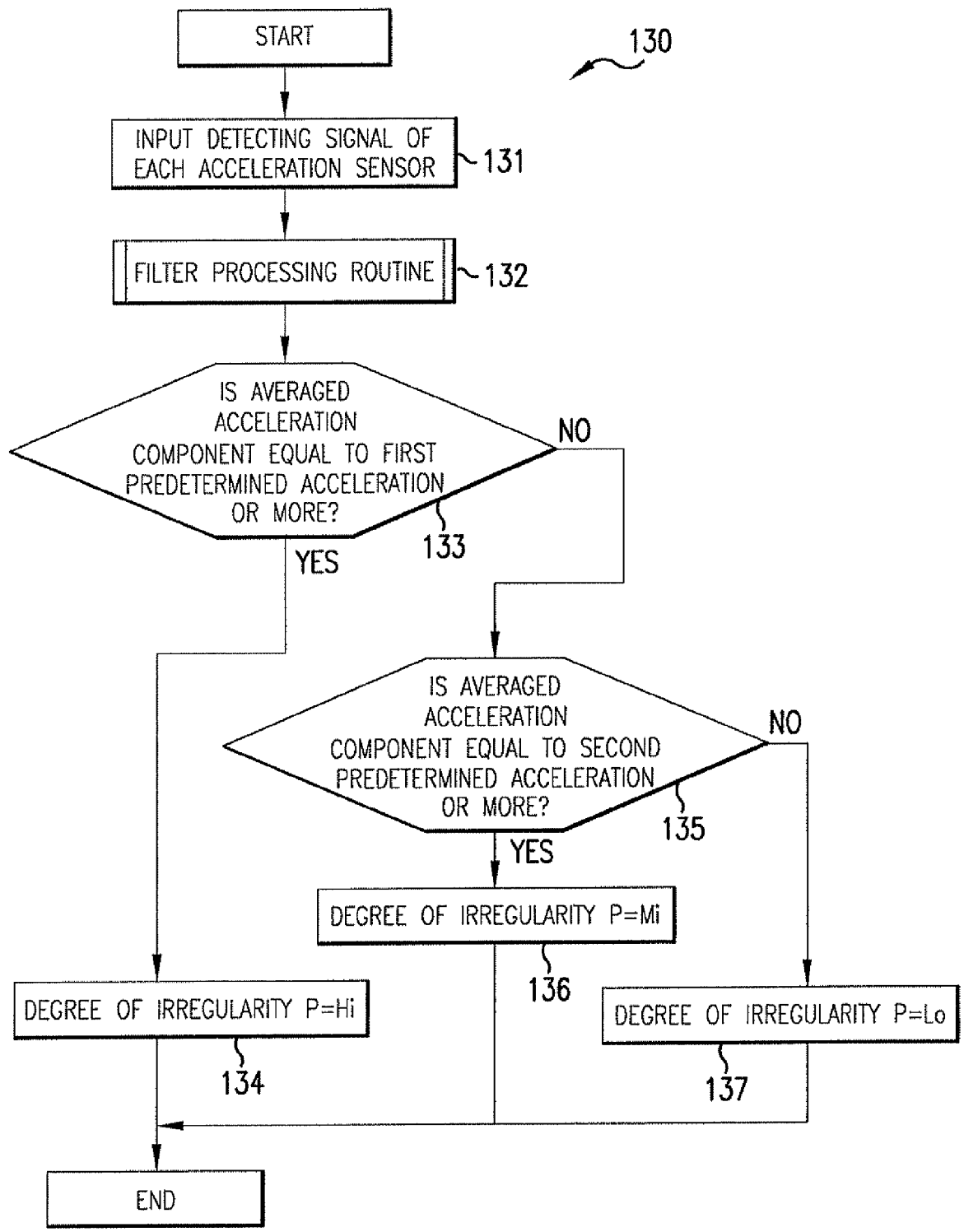
FIG. 9 is a flowchart of the degree of irregularity setting routine (step 130 in FIG. 8).
Figure 10:
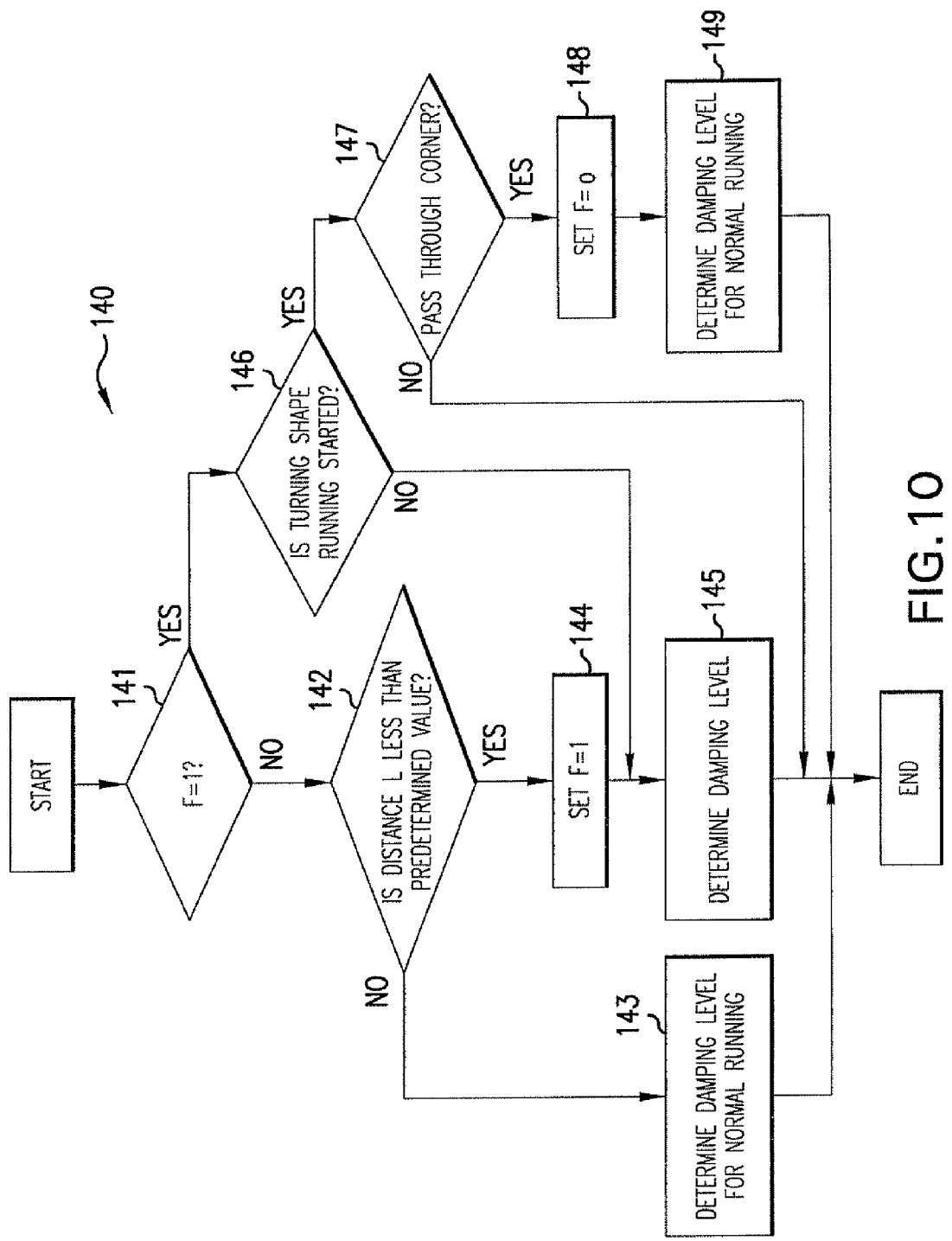
FIG. 10 is a flow chart of the damping level determination routine (step 140 in FIG. 8).

The microprocessor 50 executes a suspension control program in accordance with the respective flow charts shown in FIGS. 8 to 10 to adjust the damping force of each of the suspension devices S1 to S4 on the basis of the output of the computer 30f of the navigation device N, and the outputs of the vehicle speed sensor 30b, the gyro sensor 41e, the respective acceleration sensors 41a to 41d and the steering sensor 42.

The respective driving circuits 60a to 60d operate the electromagnetic diaphragm valves 13 of the respective suspension devices S1 to S4 under control of the microprocessor 50.

In this first embodiment, when the computer 30f of the navigation device N starts the execution of the navigation control program in accordance with the flow chart of FIG. 5, basic guidance is provided by the navigation device N by execution of a basic navigation routine 100 (see FIG. 6).

First, if request for display of a map is made by operation of the input device 30d, the judgement is YES in step 101 of FIG. 6. Next, in step 102, map data for the requested map is read from the memory device 30e. Thereafter, in step 103, a routine for display of the requested map is executed, whereby the output device 30g displays the requested map on the basis of the road map data.

Next, a route search is executed in step 104 on the basis of the outputs of the GPS sensor 30a and the gyro sensor 41e and an input destination (input using the input device 30d). In step 105, route guidance is provided on the basis of the results of the route search. In accordance with this guidance processing, the automobile driver is assisted in following the route determined by the route search.

Figure 11:
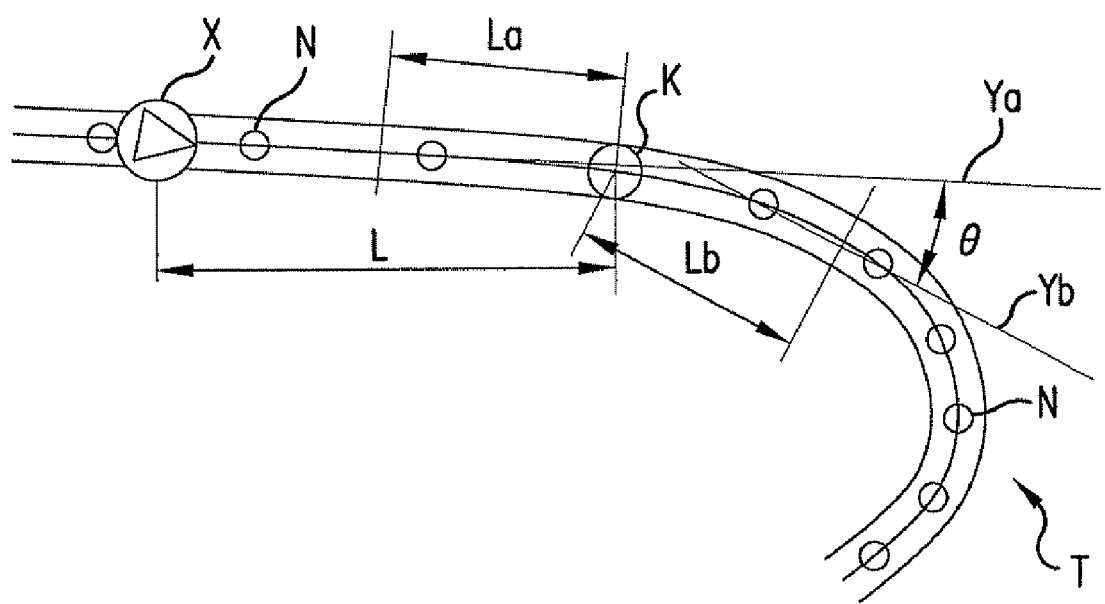
FIG. 11 is a schematic view of a road including a curve starting point.

When the execution of the basic navigation routine 100 is completed, a travel environment recognition routine 110 (see FIGS. 5 and 7) is executed as follows. First, as shown in FIG. 11, it is assumed that plural nodes N show a starting point K of a curve around a corner T, as a transition from a road extending in a straight line in the direction of advance of the automobile. The nodes N, included in the read map data, serve as positions for calculating a radius of curvature Ra for the corner T.

The curve starting point K is judged as follows in step 111 of FIG. 7. First, as shown in FIG. 11, the angle formed by straight lines Ya and Yb is calculated as a turning angle θ at each of the nodes N in advance of the automobile. Here, the straight line Ya is a straight line passing through a pair of nodes adjacent to and preceding and following a point a predetermined distance La backward from an object node K. Further, the straight line Yb is a straight line passing through nodes adjacent to and preceding and following a position a predetermined distance Lb forward from the object node K.

When the turning angle θ is calculated for every node N as mentioned above, the first node for which the calculated turning angle θ is greater than a predetermined angle is judged to be the curve starting point K.

Next, in step 112, the radius of curvature Ra of the corner T is calculated for every node N as the radius of a circle passing through nodes at three points in total, including nodes at two points located before and after a node N at the corner T. Here, a minimum value among the radii of curvature calculated in this way is set as radius of curvature Ra of the corner.

When step 112 is completed, a running environment information transmission routine is executed (step 120 in FIG. 5). In this routine, information relative to the curve starting point K determined in the running environment recognition routine 110 and the radius of curvature Ra of the corner T are output to the electronic controller E.

In execution of the degree of irregularity setting routine 130 (see FIG. 9) by the microprocessor 50 of the electronic controller E, in the first routine in the suspension control program shown in FIG. 8, an acceleration signal from each of the acceleration sensors 41a to 41d is input to the microprocessor 50 in a step 131.

The filter processing routine 132 involves sampling of the acceleration signal of each of the acceleration sensors 41a to 41d input in the step 131, and extraction of an acceleration component G' at a predetermined frequency and its averaging, which are performed as follows.

Figure 23:
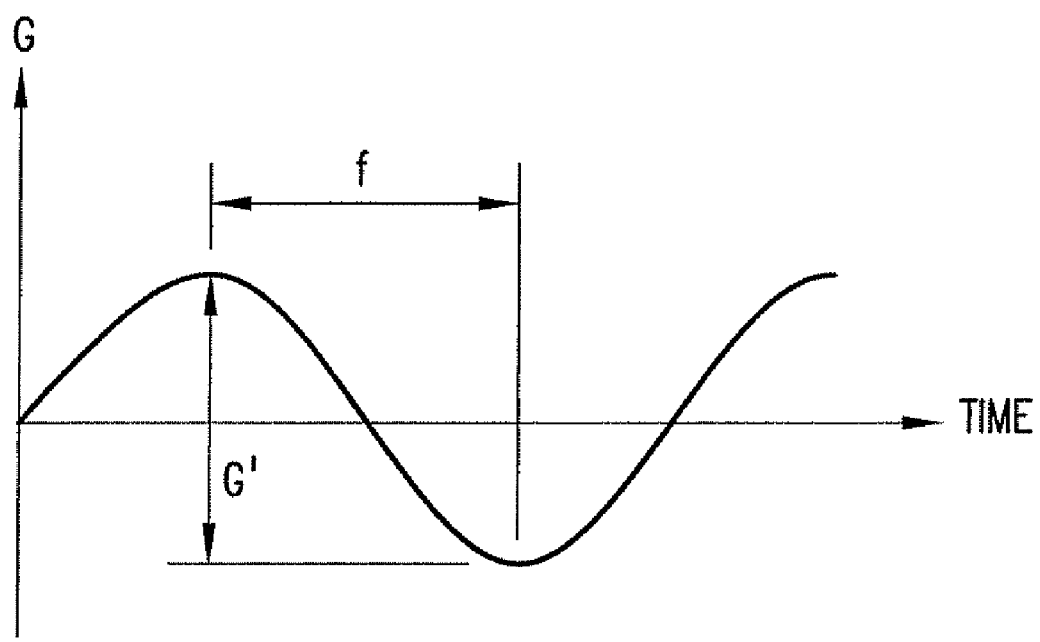
FIG. 23 is a graph of detected acceleration G versus time, showing frequency f and the acceleration component G'.

Namely, in the sampling, the acceleration signal G of each of the acceleration sensors 41a to 41d is sequentially sampled with the passage of time, e.g., every tenth acceleration signal from each of the acceleration sensors 41a-41d as shown in FIG. 23. On the basis of the data sampled in this way, the acceleration component G' corresponding to a predetermined frequency within the range of 10 (Hz) to 20 (Hz) is sequentially extracted from the sampling data for each of the acceleration sensors 41a-41d. All the acceleration components extracted in this way are then averaged to obtain an average acceleration component as the arithmetic mean.

In this embodiment, the above acceleration component determined at a frequency within the range of 10 (Hz) to 20 (Hz) because such a frequency corresponds to irregularity of a road surface which is irregular approximately to the extent of that creating discomfort for a passenger. The averaged acceleration component is a component common to the respective suspension devices S1 to S4 of the automobile.

Next, it is judged in step 133 whether or not the above averaged acceleration component is equal to or greater than a first predetermined acceleration. Here, this first predetermined acceleration corresponds to that from a road surface having a worst case irregularity. In this embodiment, the first predetermined acceleration is set to, e.g., 2.0 G.

When the averaged acceleration component is greater than the first predetermined acceleration, the judgement in step 133 is YES and the degree of irregularity P=Hi is set in step 134. Here, the degree of irregularity P represents the degree of irregularity of the road surface traveled by the automobile, and a degree of irregularity P=Hi indicates that the road surface traveled by the automobile is a worst case degree of irregularity.

When the judgment in step 133 is NO, it is then determined in step 135 whether or not the averaged acceleration component is equal to or greater than a second predetermined acceleration. Here, this second predetermined acceleration corresponds to a state less irregular than the worst case irregularity corresponding to the first predetermined acceleration, and is set to e.g., 1.0 G in this embodiment.

When the averaged acceleration component is equal to or greater than the second predetermined acceleration, the judgement in step 135 is YES. Next, a degree of irregularity P=Mi is set in step 136. Here, degree of irregularity P=Mi indicates that the degree of irregularity of the road surface traveled by the automobile is a degree gentler than the worst case degree of irregularity corresponding to P=Hi.

When the judgment in step 135 is NO, a degree of irregularity P=Lo is set in step 137. Here, the degree of irregularity P=Lo indicates that the degree of irregularity of the road surface traveled by the automobile is the gentlest degree, e.g., approximately corresponding to a flat road surface. Further, steering instability and riding discomfort are stepwise less with changing of the degree of irregularity P to P=Hi, P=Mi and P=Lo.

When the degree of irregularity setting routine 130 is finished, a damping level determination routine 140 (see FIGS. 8 and 10) is next executed. In execution of this damping level determination routine 140, it is judged in step 141 whether or not a flag F is F=1. Here, F=1 shows that the automobile is in running under corner control. F=0 shows that the automobile is not in the course of execution of the corner control program.

If the flag F is F=0 in step 141, the corner control program is not being executed so that the judgment is NO. In the next step 142, the present position X of the automobile is detected on the basis of the output of the GPS sensor 30a from the computer 30f of the navigation device N. The distance L from this detected present position X of the automobile to the curve starting point K is then calculated. It is then judged whether or not this calculated distance L is less than a predetermined distance. When the distance L is not less than this predetermined distance, the judgement is NO in step 142.

Thereafter, a damping level Cn is determined as Cn=2 as a damping level for normal running of the automobile in step 143. Here, the damping level Cn is a level common for the diaphragm aperture (corresponding to an adjusting amount) of each electromagnetic diaphragm valve 13, i.e., a level corresponding to a common damping force for each of the suspension devices S1 to S4.

When the judgment in step 142 is YES, the flag F is set to F=1 in step 144 since the distance L is determined to be less than the predetermined distance. After step 144, determination of the damping level Cn common for the diaphragm aperture of each electromagnetic diaphragm valve 13 (corresponding to the damping force of each of the suspension devices S1 to S4) is performed as follows in step 145.

First, an estimated transverse acceleration G is calculated on the basis of the vehicle speed V of the automobile and the radius of curvature Ra of the corner T by using the following formula I. The estimated transverse acceleration G is an estimated transverse acceleration applied to the automobile in travel of the automobile in a turn around the corner T.

Estimated Transverse Acceleration:

$$G=\{(V\times Vr)2\}/Ra \qquad \mathrm{I}$$

wherein Vr is a deceleration correction coefficient. This deceleration correction coefficient Vr is a correction coefficient for estimating and correcting the deceleration from the vehicle speed V in the present position X of the automobile to the vehicle speed during travel of the automobile around the corner. In this embodiment, for example, Vr=0.8 to 0.9 is set.

The above formula I is stored in a ROM of the microprocessor 50 in advance.

The damping level Cn is determined as follows by using the estimated transverse G and the above degree of irregularity P, on the basis of map shape data given in the following Table 1.

TABLE 1

| estimated transverse G | Degree of irregularity | | |
|---|---|---|---|
| | P = Hi | P = Mi | P = Lo |
| G3 < G | Cn = 5 | Cn = 6 | Cn = 7 |
| G2 < G≤G3 | Cn = 4 | Cn = 5 | Cn = 6 |
| G1 < G≤G2 | Cn = 3 | Cn = 4 | Cn = 5 |
| G≤G1 | Cn = 2 | Cn = 3 | Cn = 4 |

In the map shape data of the above Table 1, the damping level Cn represents the relationship between the degree of irregularity P and the estimated transverse acceleration G. In this case, the estimated transverse acceleration G is set so as to be increased in the order of G=G1, G=G2 and G=G3.

When the degree of irregularity P=Hi is set as mentioned above and the estimated transverse acceleration G is greater than G1 and is G2 or less, the damping level is determined to be Cn=3 on the basis of the data of Table 1. Further, when the degree of irregularity P=Mi is set and the estimated transverse acceleration G is greater than G1 and is G2 or less, the damping level is determined to be Cn=4 on the basis of the data of Table 1. Further, when the degree of irregularity P=Lo is set and the estimated transverse acceleration G is greater than G1 and is G2 or less, the damping level is determined to be Cn=5 on the basis of the data of Table 1.

Figure 12:
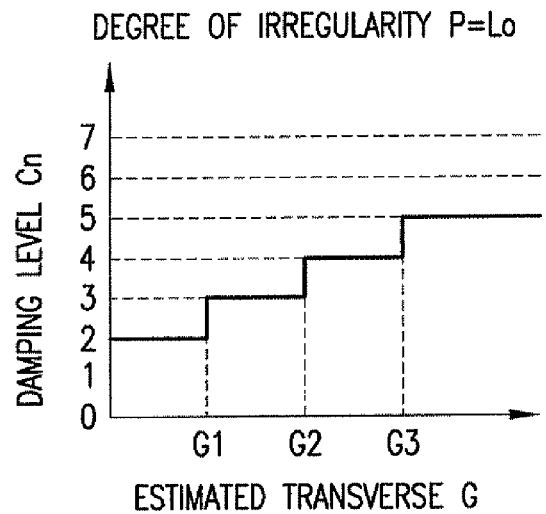
FIG. 12 is a graph of the relationship between damping level Cn and an estimated transverse acceleration G, as shown by a degree of irregularity P=Hi in the first embodiment.
Figure 13:
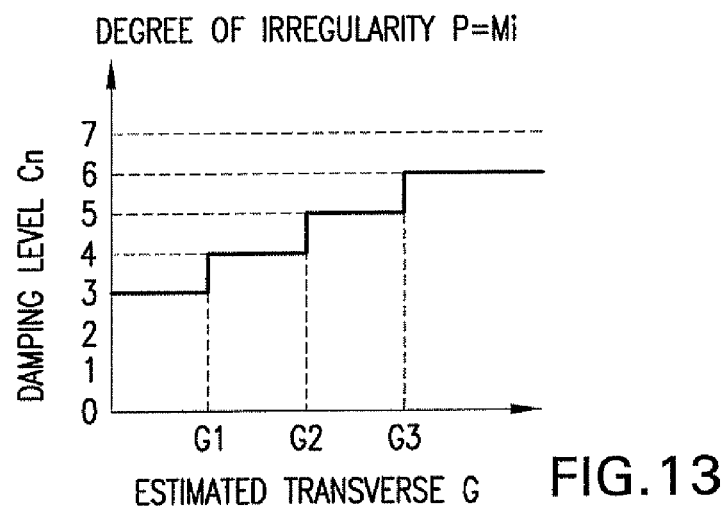
FIG. 13 is a graph of the damping level Cn versus the estimated transverse acceleration G, as shown by a degree of irregularity P=Mi in the first embodiment.
Figure 14:
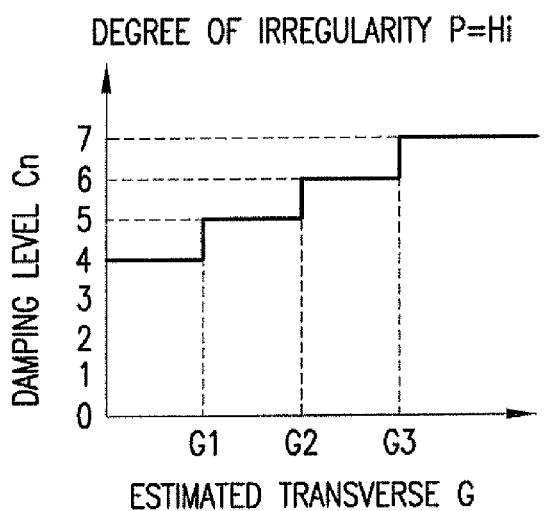
FIG. 14 is a graph of the damping level Cn versus the estimated transverse acceleration G, as shown by a degree of irregularity P=Lo in the first embodiment.

The relationship between the damping level Cn, the estimated transverse acceleration G and the degree of irregularity P in the data of Table 1 will now be explained with reference to FIGS. 12 to 14. In the relationship between the damping level Cn and the estimated transverse acceleration G, as shown by FIGS. 12 to 14, the damping level Cn is increased as the estimated transverse acceleration G increases. The estimated transverse acceleration G is increased as the vehicle speed of the automobile during running of the corner is increased or the radius of curvature Ra of the corner is less.

Conversely, in the relationship between the damping level Cn and the degree of irregularity P, as shown in FIGS. 12 to 14, the damping level Cn is reduced as the degree of irregularity P becomes worse in the order of P=Lo, P=Mi and P=Hi. Namely, as the averaged acceleration component increases, the degree of irregularity becomes worse and the damping level Cn is reduced.

If the flag F is F=1, when the execution of the damping level determination routine 140 has proceeded to step 141 as mentioned above, the corner control is in effect so that the judgment is YES. Next, when the output of the steering sensor 42 indicates approximately the neutral position, the automobile has not started turning the corner. Accordingly, the judgement is NO in step 146. In accordance with this judgment, similar to the above case, the determination of the damping level Cn common to the diaphragm aperture of each electromagnetic diaphragm valve 13 is made in step 145.

However, when the automobile is found to have started turning the corner in step 146, the judgement is YES, based on the output of the steering sensor 42. Next, it is judged in step 147 whether or not the automobile has passed through the corner T, i.e., completed the turn. At the present stage, just after the judgement YES in step 146, the judgement is NO in step 147, on the basis of the output of the gyro sensor 41e from the computer 30f.

In accordance with this judgment, the suspension control program proceeds to complete the damping level determination routine 140 without making a new determination of the damping level Cn in step 145. This means that the damping level Cn already determined in step 145 is held, in consideration of the degree of irregularity of the road surface just before the automobile enters the turn. This holding of the damping level Cn is maintained and the judgement becomes YES in step 147.

Thereafter, when the judgement is YES in step 147 on the basis of the output of the gyro sensor 41e from the computer 30f indicating that the automobile has completed turning the corner T in step 147, F=0 is set in step 148. Next, similar to step 143, the damping level Cn is determined as Cn=2 as a damping level for the normal running of the automobile in step 149.

When the damping level determination routine 140 (see FIGS. 8 and 10) is terminated, the diaphragm aperture of each electromagnetic diaphragm valve 13 of the respective suspension devices S1 to S4 is determined as follows in the next step 150 (see FIG. 8) in accordance with the result in one of the above steps 143, 145, 147 and 149.

Figure 15:
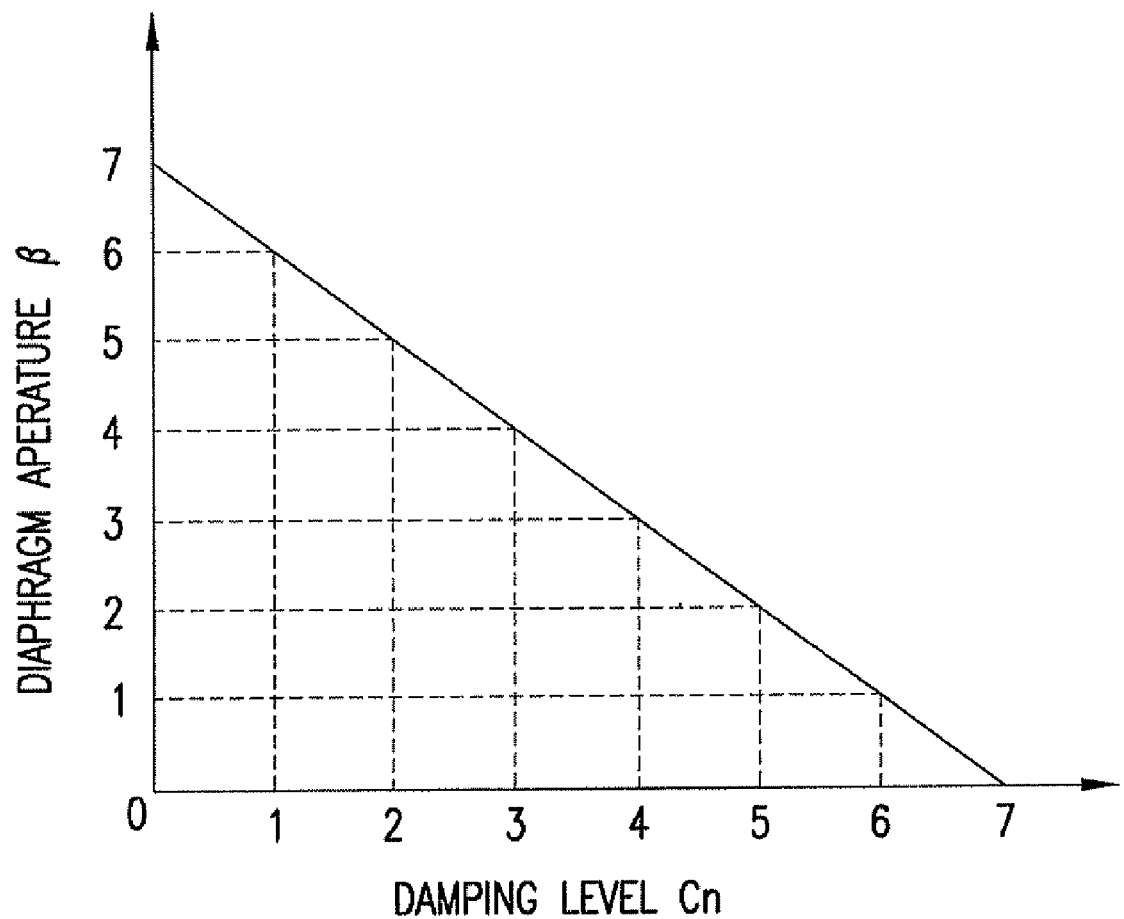
FIG. 15 is a graph showing the relationship between the diaphragm aperture β of an electromagnetic diaphragm valve and the damping level Cn.

When the damping level Cn is determined as Cn=2 in step 143, the diaphragm aperture β for the electromagnetic diaphragm valve 13 of each of the suspension devices S1 to S4 is determined as β=5 on the basis of the damping level Cn=2 from the graph of the relationship between the diaphragm aperture β and the damping level Cn (β-Cn characteristics) shown in FIG. 15. In this embodiment, as shown in FIG. 15, the diaphragm aperture β is set so as to be increased (or decreased) in accordance with a reduction (or increase) in the damping level Cn.

When the diaphragm aperture β is determined as β=5, the diaphragm aperture β is output to respective driving circuits 60a to 60d as data showing β=5 in step 150. Thus, each of the driving circuits 60a to 60d operates an electromagnetic diaphragm valve 13 on the basis of this output data. This operation is performed such that all the diaphragm apertures of the respective electromagnetic diaphragm valves 13 are adjusted to the diaphragm aperture β=5.

When the diaphragm aperture is adjusted in this way, each electromagnetic diaphragm valve 13 greatly increases the flow of operating oil between the hydraulic compartments 12a and 12b and greatly reduces the resistance to circulation of the operating oil, since the diaphragm apertures β have been enlarged to β=5 as mentioned above. Thus, the damping force of each of the suspension devices S1 to S4 is controlled so as to be reduced during straight running of the automobile just before the entry into the turn around the corner T, and riding comfort (ride sensation) during travel along the straight road can be optimized, irrespective of the degree of irregularity of the road surface.

When the damping level Cn is determined in step 145 after the judgement YES in step 142, the diaphragm aperture β is determined as follows from the β-Cn characteristics shown in FIG. 15 on the basis of the damping level Cn in step 150.

For example, when the degree of irregularity (see step 134 in FIG. 9) is set as P=Hi and the damping level is determined as Cn=3, since the estimated transverse G is greater than G1 and is G2 or less, the diaphragm aperture β of each electromagnetic diaphragm valve 13 is determined as β=4 on the basis of the damping level Cn=3 from the β-Cn graph shown in FIG. 15. Such a determination corresponds to that for a road surface having the worst case degree of irregularity.

When the degree of irregularity is judged to be P=Lo (see step 137 in FIG. 9) and the damping level is determined as Cn=6, since the estimated transverse G is greater than G2 and is G3 or less, the diaphragm aperture β for each electromagnetic diaphragm valve 13 is determined as β=1 on the basis of the damping level Cn=6 from the β-Cn graph shown in FIG. 15. Such a determination corresponds to that for the lowest degree of irregularity of the road surface.

Next, the diaphragm aperture β (e.g., β=4 or 1) determined in this way is output to each of the driving circuits 60a to 60d in step 150 and each of the suspension devices S1 to S4 is controlled responsive to this output.

For example, when the diaphragm aperture β which is output to each of the driving circuits 60a to 60d is β=4 (step 150), the driving circuits 60a to 60d adjust the diaphragm apertures β of the respective electromagnetic diaphragm valves 13 to β=4. This adjustment of the electromagnetic diaphragm valves 13 to β=4 greatly increases the amount of flow of the operating oil between the hydraulic compartments 12a and 12b, and greatly reduces resistance to circulation of the operating oil. Thus, the respective electromagnetic diaphragm valves 13 greatly reduce the damping forces of the suspension devices S1 to S4.

On the other hand, when the diaphragm aperture data for β=1 is output to each of the driving circuits 60a to 60d (step 150), the respective driving circuits 60a to 60d adjust the diaphragm apertures β of the electromagnetic diaphragm valves 13 to β=1. When the diaphragm aperture β is adjusted to β=1, each electromagnetic diaphragm valve 13 greatly decreases the amount of flow of the operating oil between the hydraulic compartments 12a and 12b by increasing the resistance to circulation of the operating oil. Thus, each electromagnetic diaphragm valve 13 greatly increases the damping force of the respective suspension devices S1 to S4.

The damping force of each of the suspension devices S1 to S4 is controlled by also taking into consideration the degree of irregularity of the road surface in straight travel of the automobile before entering the curve at starting point K, i.e., just before initiation of the corner control by controlling the damping force as described above. For example, when the diaphragm aperture is determined as β=4, the road surface has the worst degree of irregularity. Therefore, the damping force of each of the suspension devices S1 to S4 is controlled so as to be greatly reduced just before the entry of the automobile into the turn around corner T. Accordingly, it is possible to set the ride sensation for straight travel just before the entry of the automobile into the curve, even though the road surface has the worst degree of irregularity.

The diaphragm aperture is determined as β=1 for the lowest degree of irregularity. Accordingly, the damping force of each of the suspension devices S1 to S4 is set higher. Thus, steering stability in turning the corner T can be set as preferred.

Further, when the damping level Cn is determined in step 145 after a NO determination in step 146, execution of the corner control is started. Thereafter, in straight travel, up to just before entry of the automobile into the turn at corner T, the damping force of each of the suspension devices S1 to S4 is controlled in a manner similar to the case in which the damping force is controlled by adjusting the diaphragm aperture β in step 150, after the determination YES in step 142.

Further, when the judgement is NO in step 147 after a YES determination in step 146, the damping level Cn already determined in step 145, just before the YES determination in step 146 is maintained. This means that the damping force of each of the suspension devices S1 to S4 is controlled taking into consideration the degree of irregularity of the road surface just before the entry of the automobile into the curve around corner T and set in advance to be held and utilized as the damping force after entry of the automobile into the curve around corner T. Accordingly, when the automobile enters into the turn (curve) around corner T, the operations of the respective suspension devices S1 to S4 are estimated and controlled so as to maintain the damping force already set in advance just before entry of the automobile into the turn around the corner T. As a result, the steering stability and the ride sensation during travel of the automobile in turning the corner T can be preferably maintained even when there are irregularities in the road surface around the corner T.

Further, when the damping level Cn is determined as Cn=2 in step 149 after a judgement YES in step 147, the diaphragm aperture β of each electromagnetic diaphragm valve 13 is set to β=5, by application of the damping level Cn=2 to the graph of FIG. 15.

When the diaphragm aperture β is set to be β=5, data for the diaphragm aperture β=5 is output to each of the driving circuits 60a to 60d in step 150. Thus, the respective driving circuits 60a to 60d operate the respective electromagnetic diaphragm valves 13 on the basis of this output data. When the diaphragm aperture is enlarged to β=5 in this way, each electromagnetic diaphragm valve 13 greatly increases the flow of the operating oil between the hydraulic compartments 12a and 12b by reducing resistance to circulation of the operating oil. Thus, in straight line travel of the automobile after passage around the corner, the damping force of each of the suspension devices S1 to S4 is reduced to provide a comfortable ride in straight line travel.

Second Embodiment

Figure 16:
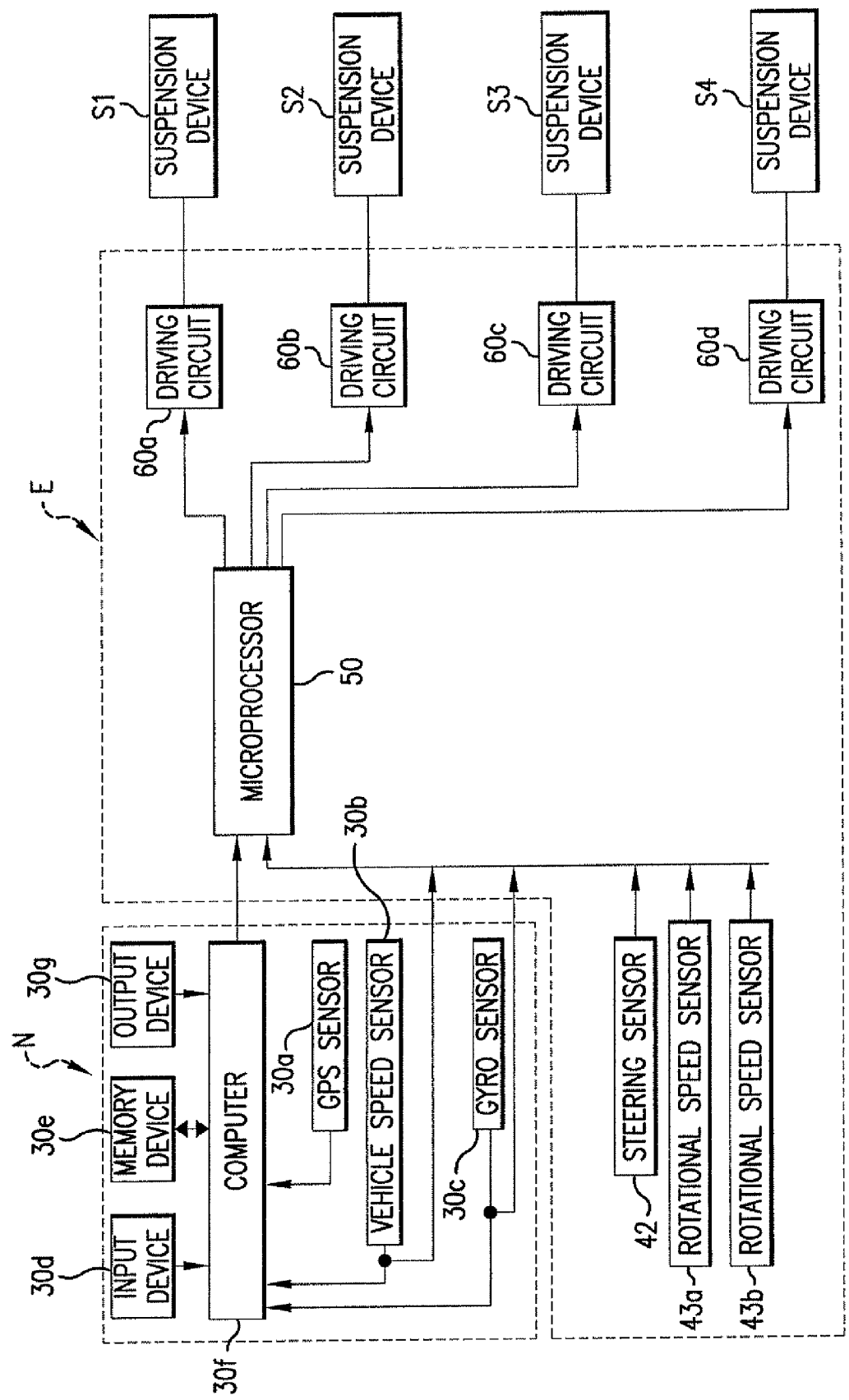
FIG. 16 is a block diagram of a second embodiment of the present invention.

FIG. 16 shows a second embodiment of the present invention in which rotational speed sensors 43a, 43b are used instead of the acceleration sensors 41a to 41d in the electronic controller E of the above first embodiment. Each of these rotational speed sensors 43a, 43b is arranged near a drive wheel of an axle of the automobile. Each of these rotational speed sensors 43a, 43b detects the rotational speed of a drive wheel.

Figure 17:
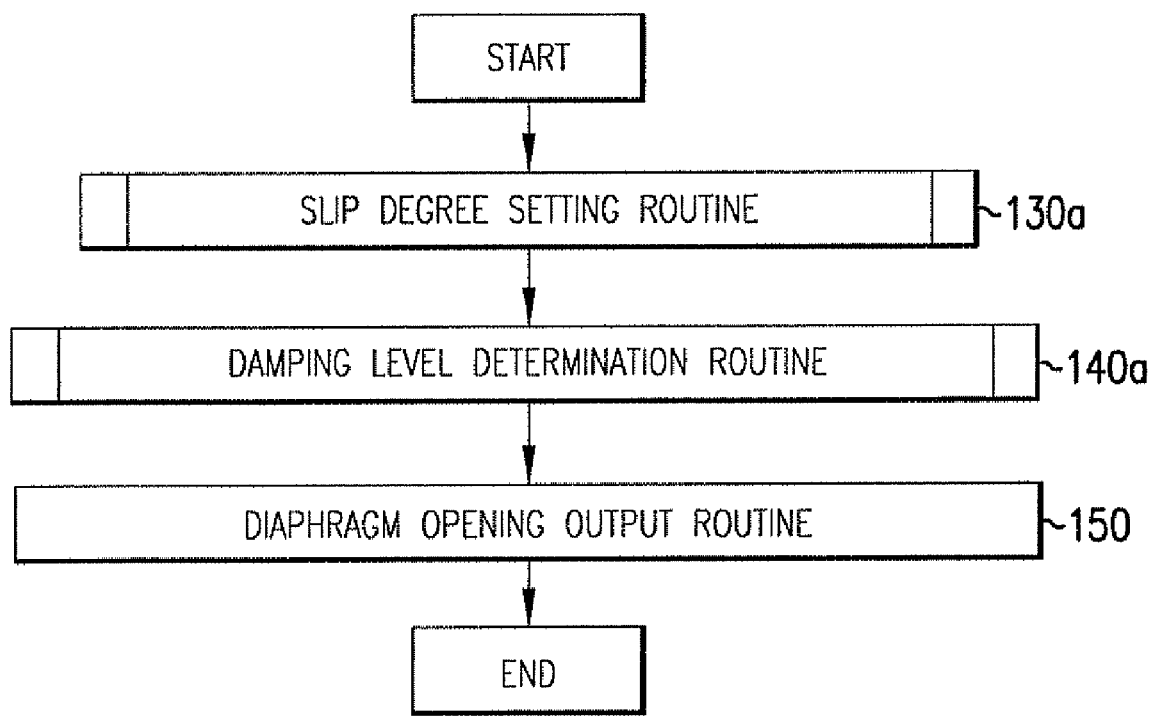
FIG. 17 is a flow chart of a suspension control program executed by a microprocessor of the electronic controller in FIG. 16.
Figure 18:
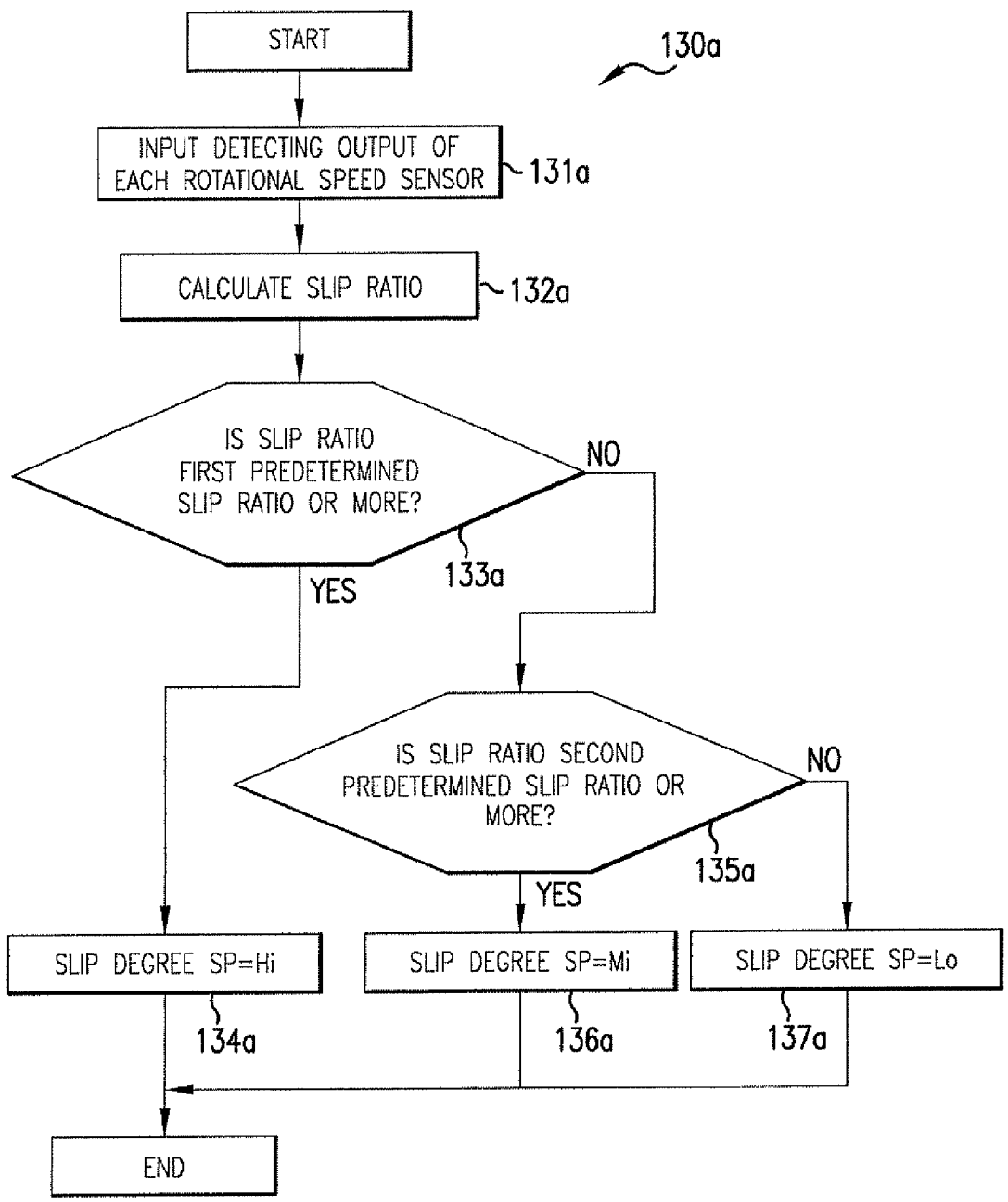
FIG. 18 is a flow chart of the degree of slip setting routine (step 130a in FIG. 17).
Figure 19:
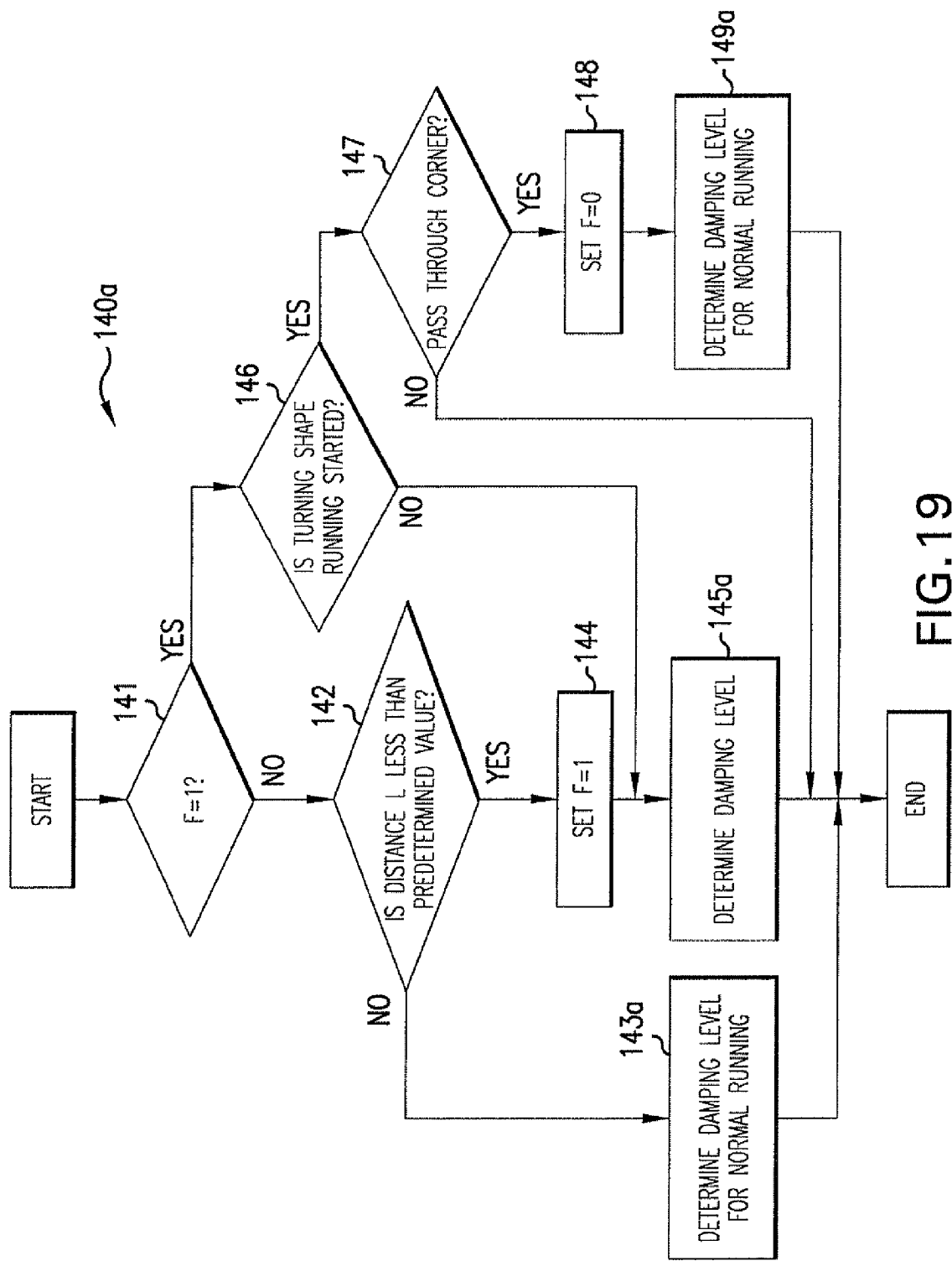
FIG. 19 is a flow chart of the damping level determination routine (step 140a in FIG. 17).

Further, this second embodiment is operated in accordance with the flow chart of FIG. 17, instead of the flow chart of FIG. 8 as in the first embodiment. Further, this second embodiment employs the slip degree setting routine 130a of FIG. 18 and the damping level determination routine 140a of FIG. 19, instead of the degree of irregularity setting routine 130 of FIG. 9 and the damping level determination routine 140 of FIG. 10 in the suspension control program of the first embodiment. Other features are similar to those of the first embodiment.

In this second embodiment, similar to the processing in the first embodiment, the microprocessor 50 of the electronic controller E begins to execute the above suspension control program in accordance with the flow chart of FIG. 17 when execution of the navigation basic routine 100 of FIG. 5 through step 120 has been terminated.

However, when the suspension control program proceeds to the slip degree setting routine 130a (see FIG. 18), signals from the respective rotational speed sensors 43a, 43b are input to the microprocessor 50 in step 131a. Thus, the microprocessor 50 calculates an average value (hereinafter referred to as average rotational speed α) of the rotational speeds of the respective drive wheels on the basis of these signals.

Next, in step 132a, a slip ratio is calculated in a manner which differs depending on whether the automobile is in a driving state or in a braking state. Here, "driving state" means that the automobile is traveling with positive acceleration in its direction of advance. In contrast "braking state" means that the automobile is running with negative acceleration with respect to its direction of advance.

When the automobile is in the driving state, the slip ratio is calculated on the basis of the average rotational speed α and the vehicle speed V of the automobile by using the following formula II:

Slip ratio=$\{(\pi \times D \times a) - V\}/(\pi \times D \times a)$  II wherein, $\pi$ is the ratio of the circumference of a circle to its diameter and D is the diameter of the drive wheel.

Further, when the automobile is in the braking state, the slip ratio is calculated on the basis of the above average rotational speed $\alpha$ and the vehicle speed V of the automobile by using the following formula III:

Slip ratio=$\{V - (\pi \times D \times a)\}/V$  III

The above formulas II and III are stored in the ROM of the microprocessor 50 in advance.

After step 132a, a judgement is made in step 133a whether or not the slip ratio calculated in the step 132a is equal to or greater than a first predetermined slip ratio. Here, this first predetermined slip ratio corresponds to that for a road surface having a worst case slip state. In this embodiment, the first predetermined slip ratio is set to, e.g., 40%.

When the calculated current slip ratio is equal to or greater than the first predetermined slip ratio, the result is YES in step 133a. Next, a slip degree SP=Hi is set in step 134a. Here, the slip degree SP shows the degree of slip on the road surface as currently traveled by the automobile. The slip degree SP=Hi shows that the road surface has a worst case degree of slip.

In contrast, when the judgment in step 133a is NO, in step 135a a determination is made as to whether or not the slip ratio is equal to or greater than a second predetermined slip ratio. This second predetermined slip ratio corresponds to an un-slippery state as compared with the worst case slip state represented by the first predetermined slip ratio. In this embodiment, the second predetermined slip ratio is set to, e.g., 20%.

When the slip ratio is equal to or greater than the second predetermined slip ratio, the determination is YES in step 135a. Next, a slip degree SP=Mi is set in step 136a. The slip degree SP=Mi indicates that the degree of slip of the road surface traveled by the automobile is less slippery than the worst case degree of slip represented by the slip degree SP=Hi.

When the judgment in the above step 135a is NO, a slip degree SP=Lo is set in step 137a. Here, the degree of slip SP=Lo shows that the road surface currently run by the automobile is a best case degree, i.e., not slippery. Further, stability of the automobile while running the road surface and the influence on the riding comfort (ride sensation) are stepwise reduced as the slip degree SP changes from SP=Hi, to SP=Mi and to SP=Lo.

When the slip degree setting routine 130a is terminated, the damping level determination routine 140a (see FIG. 19) is executed. In the execution of this damping level determination routine 140a, it is judged in step 141 whether or not the flag F is F=1. If the flag F is F=0 corner control is not being executed. Therefore, the determination (judgement) is NO in step 141. In the next step 142, it is judged whether or not the distance L, calculated as in step 142 (see FIG. 10) described in connection with the first embodiment, is less than the above predetermined distance.

If this distance L is not less than the above predetermined distance, the determination is NO in step 142. In step 143a, the damping level Cn=2 is determined for normal running of the automobile. On the other hand, when the judgment in step 142 is YES, the distance L is less than the predetermined distance, accordingly, as in the first embodiment, the flag F is set to F=1 in step 144.

After step 144, a determination of a damping level Cn, common to the respective suspension devices S1 to S4, is made in step 145a.

First, the estimated transverse acceleration G is calculated by using formula I, on the basis of the vehicle speed V and the radius of curvature Ra of the corner T.

Next, the damping level Cn is determined as follows, using the estimated transverse acceleration G and the slip degree SP on the basis of map shape data of the following Table 2.

TABLE 2

| estimated transverse | slip degree SP | | |
|---|---|---|---|
| acceleration G | SP = Hi | SP = Mi | SP = Lo |
| G3 < G | Cn = 5 | Cn = 6 | Cn = 7 |
| G2 < G£G3 | Cn = 4 | Cn = 5 | Cn = 6 |
| G1 < G£G2 | Cn = 3 | Cn = 4 | Cn = 5 |
| G£G1 | Cn = 2 | Cn = 3 | Cn = 4 |

Here, in the map shape data of this Table 2, the damping level Cn is specified by the relationship between the slip degree SP and the estimated transverse acceleration G. However, when the slip degree is set as SP=Hi, the damping level is determined as Cn=3 on the basis of the data of Table 2 when the estimated transverse acceleration G is greater than G1 and is G2 or less. Further, when the set degree of slip is SP=Mi, the damping level is determined as Cn=4 on the basis of the data of Table 2 when the estimated transverse acceleration G is greater than G1 and is G2 or less. Further, when the degree of slip SP=Lo is set, the damping level is determined to be Cn=5 when the estimated transverse acceleration G is greater than G1 and is G2 or less.

The relationship between the damping level Cn, the estimated transverse acceleration G and the degree of slip SP in the data of Table 2 will now be explained with reference to FIGS. 20 to 22. In the relationship between the damping level Cn and the estimated transverse acceleration G, as shown in FIGS. 20 to 22, the damping level Cn increases as the estimated transverse acceleration G increases.

Figure 20:
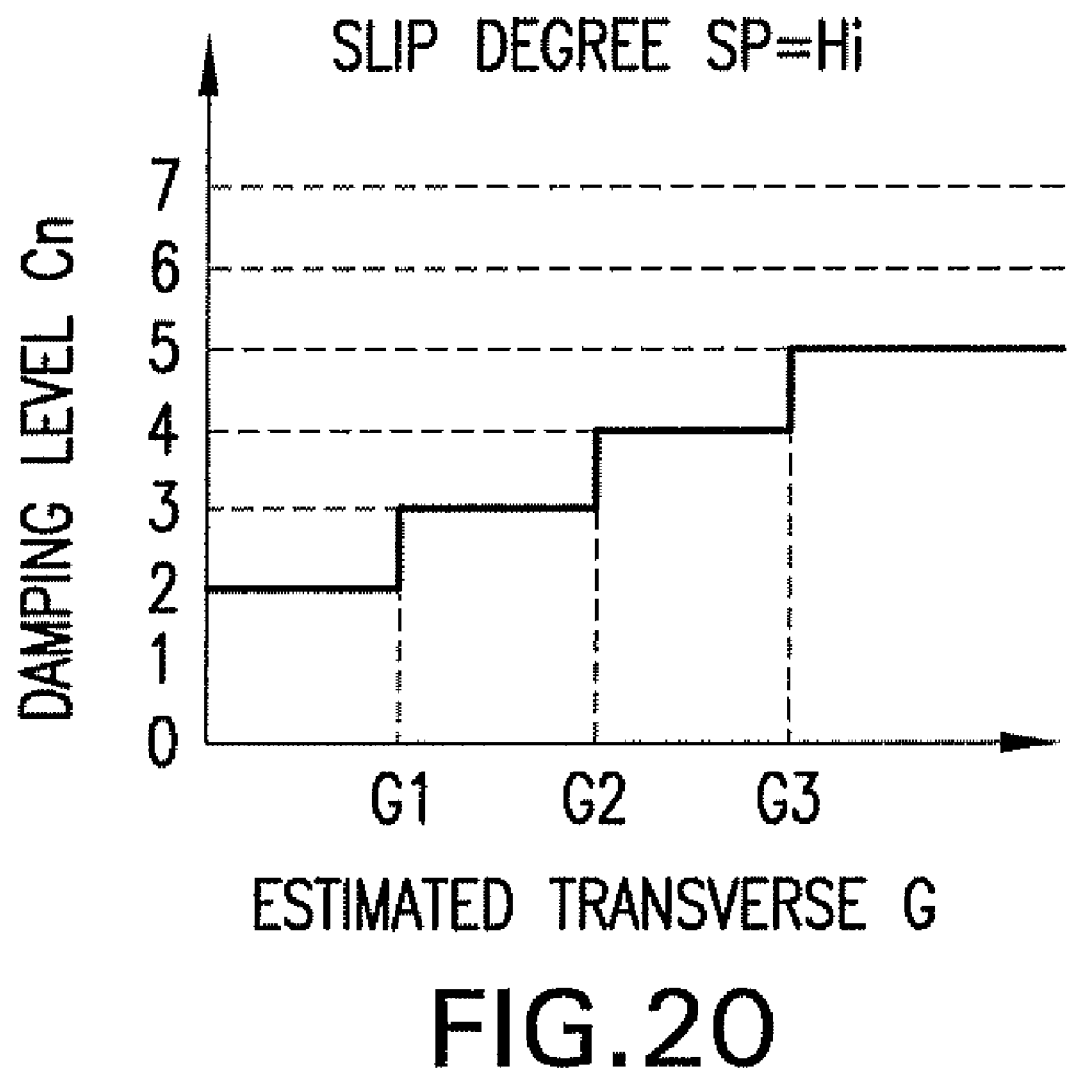
FIG. 20 is a graph showing the relationship between the damping level Cn and the estimated transverse acceleration G for a degree of slip SP=Hi in the second embodiment.
Figure 21:
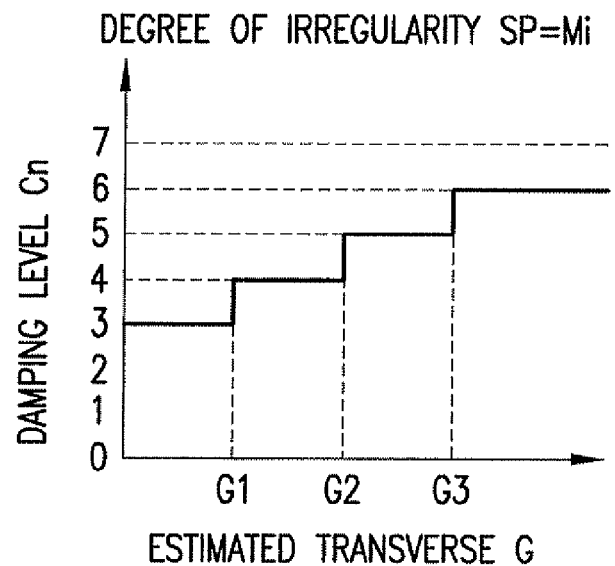
FIG. 21 is a graph of the damping level Cn versus the estimated transverse acceleration G for a degree of slip SP=Mi in the second embodiment.
Figure 22:
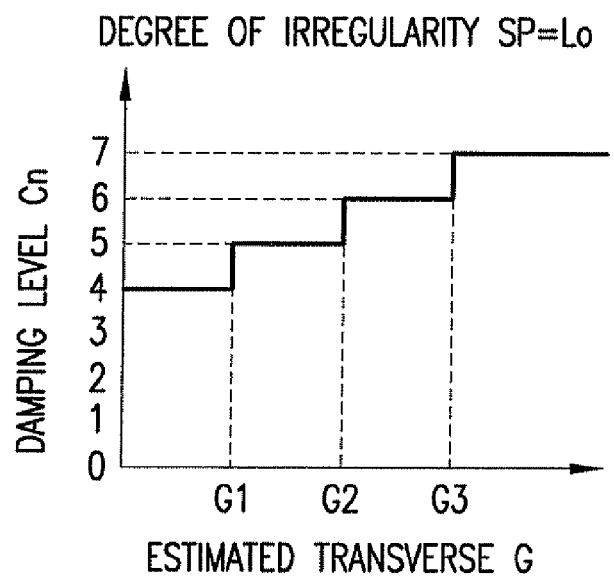
FIG. 22 is a graph of the damping level Cn versus the estimated transverse acceleration G for a degree of slip SP=Lo in the second embodiment.

Further, in the relationship between of the damping level Cn and the degree of slip SP, as shown in FIGS. 20 to 22, the damping level Cn is reduced as the slip degree SP becomes worse in the order of SP=Lo, SP=Mi and SP=Hi. Namely, as the slip degree becomes worse, the damping level Cn is reduced.

When the damping level determination processing routine 140a proceeds to step 141, corner control is being executed if the flag F is F=1. Therefore, the judgment in step 141 is YES. Next, when the automobile has not started turning a corner, when the determination is NO in step 146, on the basis of the output of the steering sensor 42 as in the first embodiment, the determination of a damping level Cn common to the diaphragm apertures of all electromagnetic diaphragm valves 13 is made in step 145a as in the above case.

On the other hand, when the automobile has started turning a corner in step 146, the determination is YES. Next, a judgement is made in step 147 whether or not the automobile has completed turning the corner T as described in connection with the first embodiment, just after a judgement YES in step 146. Accordingly, similar to the first embodiment, the judgement is NO in the step 147.

In accordance with this judgment, the suspension control program proceeds to the last step of the damping level determination routine 140a without newly determining the damping level Cn in step 145a. This means that the damping level Cn already determined in the step 145a is held by also taking into consideration the degree of slip for the road surface immediately preceding the point (K) where the automobile starts turning the corner. This holding of the damping level Cn is maintained until the judgement becomes YES in step 147.

Thereafter similar to the first embodiment, when the judgement becomes YES in step 147, i.e., when the automobile has completed turning the corner T, F=0 is set in step 148 similar to the case described in connection with the first embodiment. Next, similar to step 143a, the damping level Cn is determined as Cn=2 as a damping level for the normal running of the automobile in step 149a.

When the damping level determination routine 140a (see FIGS. 17 and 19) is terminated, the diaphragm aperture of each electromagnetic diaphragm valve 13 is set in the next step 150 (see FIG. 17), in accordance with the results of one of the steps 143a, 145a, 147, 149a.

As mentioned above, when the damping level Cn is determined as Cn=2 in step 143a, the diaphragm aperture β for each electromagnetic diaphragm valve 13 is set to β=5 on the basis of the damping level Cn=2 from the β-Cn characteristic graph of FIG. 15.

When the diaphragm aperture is determined as β=5 in this manner, data for β=5 is output to each of the driving circuits 60a to 60d in step 150 and the driving circuits 60a to 60d operate the respective electromagnetic diaphragm valves 13 on the basis of this data output to adjust the diaphragm apertures of all the electromagnetic diaphragm valves 13 to β=5.

When the diaphragm aperture is adjusted to β=5, the diaphragm aperture is a relatively large value, i.e., on a scale of β=1 to β=5. Therefore, in travel of the automobile in a straight line just before the entry into the turn around the corner T, the damping force of each of the suspension devices S1 to S4 is reduced, and riding comfort in straight running of the automobile can be maximized irrespective of the degree of slip of the road surface.

Further, when the damping level Cn is determined in step 145a after a judgement YES in step 142, the diaphragm aperture β is determined in step 150 on the basis of the damping level Cn from the γ-Cn characteristic graph of FIG. 15.

For example, when the slip degree is SP=Hi (see step 134a of FIG. 18) and the damping level is determined as Cn=3, since the estimated transverse G is greater than G1 and is G2 or less, the diaphragm aperture β for each electromagnetic diaphragm valve 13 is determined as β=4, on the basis of the damping level Cn=3 from the β-Cn characteristic graph of FIG. 15, which corresponds to a worst case slip degree.

Further, when the slip degree is SP=Lo (see the step 137a of FIG. 18) and the damping level is determined as Cn=6 since the estimated transverse G is greater than G2 and is G3 or less, the diaphragm aperture β of each electromagnetic diaphragm valve 13 is set as β=1, by applying the damping level Cn=6 to the β-Cn characteristic graph of FIG. 15, which corresponds to a least slippery road surface.

Next, data for the diaphragm aperture β determined in this way is output to each of the driving circuits 60a to 60d in step 150 and the damping force of each of the suspension devices S1 to S4 is controlled on the basis of this output.

For example, when for the diaphragm aperture β=4 is output to each of the driving circuits 60a to 60d in step 150, the driving circuits 60a to 60d operate the respective electromagnetic diaphragm valves 13 so as to adjust the diaphragm apertures to β=4. When the diaphragm aperture is adjusted to β=4, the electromagnetic diaphragm valves 13 greatly reduce the damping force for each of the suspension devices S1 to S4.

Further, when data for a diaphragm aperture β=1 is output to each of the driving circuits 60a to 60d in step 150 as mentioned above, the driving circuits 60a to 60d operate the respective electromagnetic diaphragm valves 13 so as to adjust the diaphragm apertures to β=1. When the diaphragm aperture is adjusted to β=1 in this manner, the electromagnetic diaphragm valves 13 greatly increase the damping force of each of the suspension devices S1 to S4, similar to the above first embodiment.

In the straight running of the automobile until just before start of execution of the corner control, the damping force of each of the suspension devices S1 to S4 is controlled in consideration of the slip degree of the road surface.

When the diaphragm aperture is determined as β=4 as mentioned above, the damping force of each of the suspension devices S1 to S4 is reduced just before the automobile enters the turn around the corner T since the road surface has a high degree of slip, but ride comfort in straight running of the automobile can be maintained.

Further, when the diaphragm aperture is β=1, the damping force of each of the suspension devices S1 to S4 is greatly increased since the road surface is at the least slippery state. Thus, steering stability in turning the automobile at the corner T can be maximized.

Further, when the damping level Cn is determined in step 145a after a judgement NO in step 146, execution of corner control is started. Thereafter, in straight running, until just before the automobile enters into the turn around the corner T, the damping force of each of the suspension devices S1 to S4 is controlled by adjusting the diaphragm aperture β in step 150 after a determination of YES in step 142.

Further, when the judgement is NO in step 147, after a judgement YES in step 146, the damping level Cn already determined in step 145a, just before the judgement YES in step 146 is maintained. This means that the damping force of each of the suspension devices S1 to S4 is controlled taking into consideration the slip degree of the road surface just before entry of the automobile into the turn around the corner T and is held and utilized as the damping force after the entry of the automobile into the turn around the corner T, similar to the first embodiment.

Accordingly, when the automobile enters into the turn around the corner T, the operation of each of the suspension devices S1 to S4 is estimated and controlled so as to maintain the damping force already set, just before the entry of the automobile into the turn around the corner T. As a result, the stability and the riding comfort in the turning of the automobile around the corner T can be maximized even when the road surface at the corner T is slippery.

Further, when the damping level is Cn=2 in step 149, after a judgement YES in step 147, the diaphragm aperture of each electromagnetic diaphragm valve 13 is set to β=5 on the basis of application of the damping level Cn=2 to the β-Cn characteristic graph of FIG. 15, similar to the first embodiment.

When data for the diaphragm aperture β=5 is output to each of the driving circuits 60a to 60d, on the basis of this output data, the driving circuits 60a to 60d adjust all the diaphragm apertures of the respective electromagnetic diaphragm valves 13 to β=5.

When the diaphragm aperture is adjusted to β=5, the damping force of each of the suspension devices S1 to S4 is reduced for straight running of the automobile after having turned the corner T, similar to the above first embodiment, since the diaphragm aperture β is a large value. Thus, the riding comfort in straight running of the automobile can be maximized.

The present invention is not limited to the above embodiments; rather, various modifications may be made as follows:

(1) In judging the degree of irregularity of the road surface, a single acceleration sensor may be utilized instead of acceleration sensors 41a to 41d described in connection with the first embodiment. Further, in judging degree of irregularity of the road surface, a vehicle height sensor for detecting the height of the automobile and a stroke sensor for detecting the length of expansion of each suspension device may be utilized instead of the acceleration sensors 41a to 41d.

(2) Calculation of the estimated transverse acceleration G is not limited to use of Formula I, the deceleration correction coefficient Vr and the radius of curvature Ra. For example, an estimated transverse acceleration G may be obtained by subtracting a predetermined value from the vehicle speed V of the automobile (minus-correcting), squaring the remainder and dividing by the radius of curvature Ra.

(3) Judgment of the degree of slip of the road surface on which the automobile is traveling, is not limited to the calculation of the slip ratio from the rotational speed of a drive wheel of the automobile and the vehicle speed V, using the above formulas II and III. For example, the slip degree may be also judged by imaging of the road surface and/or by output of an ultrasonic sensor.

(4) Air suspension devices may be substituted for the suspension devices S1 to S4. Further, an active suspension device having the capability of adjusting the vehicle height may be adopted to control the posture of the automobile during the turning of the corner T.

(5) Determination of the radius of curvature Ra of the corner T, is not limited to the adoption of a minimum value of the curvature radii of all nodes N included in the corner. Instead, an average value at a number of points of smaller values for the radius of curvature may be adopted as the radius of curvature Ra of the corner.

(6) The present invention is not limited to a sedan type automobile, but may be applied in general to any vehicle. For example, the present invention may also be applied to a station wagon, a minivan or an electric railcar.

(7) The diaphragm aperture of each electromagnetic diaphragm valve 13 may also be adjusted on the basis of mutually independent damping levels instead of making the adjustment on the basis of a common damping level.

(8) The damping force of the suspension device estimated in advance before entry of the automobile into the turn around the corner T may also be controlled responsive to a combination of determination of the degree of irregularity and a determination of the degree of slip, instead of being limited to one determination or the other.

(9) The judgment in step 146, need not be based on output of the steering sensor 42. The output of a gyro sensor 41e may be utilized instead.

(10) The estimated transverse acceleration G may be also calculated by using node angle (corresponding to a turning angle θ) instead of the radius of curvature Ra.

(11) The present invention is not limited to a suspension control system for an automobile, but also includes a suspension control method for an automobile.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A suspension control system for a vehicle equipped with a navigational device, said suspension control system comprising:
    a plurality of suspension devices, each mounted between a suspension arm and a body portion of the vehicle, in association with a wheel of the vehicle, each of said suspension devices expanding and contracting in accordance with a damping force to damp forces on the vehicle received from a road surface traveled by the vehicle;
    means for detecting a degree of irregularity of the road surface;
    means for detecting vehicle speed;
    means for detecting turning of the vehicle;
    means for judging whether or not the vehicle has entered into a turn around a corner on the basis of the turning of the vehicle detected by said means for detecting turning;
    means for calculating an adjustment value corresponding to the damping force on the basis of the detected vehicle speed, the detected degree of irregularity and information relative to a corner in the road surface received from the navigation device when the vehicle approaches the corner; and
    means for outputting the calculated adjustment value to a suspension device so as to control the damping force of the suspension device, wherein when said means for judging judges that the vehicle has entered into the turn around the corner, said means for outputting outputs the calculated adjustment value to the suspension device so as to control the damping force of the suspension device in accordance with the calculated adjustment value until the vehicle has passed through the corner.

2. The suspension control system for a vehicle according to claim 1, wherein said means for calculating extracts an irregularity component corresponding to a predetermined frequency from the degree of irregularity detected by said means for detecting a degree of irregularity, and calculates the adjustment value corresponding to the damping force of said suspension means on the basis of the irregularity component.

3. The suspension control system for a vehicle according to claim 1, wherein said means for calculating stops the calculation of the adjustment valve when the means for judging judges that the vehicle has entered into a turn around said corner, and wherein the adjustment value last calculated before stopping the calculation is used to control the damping force of said suspension devices in travel of the vehicle in passing through the corner.

4. The suspension control system for a vehicle according to claim 1, wherein said means for calculating extracts an irregularity component corresponding to a predetermined frequency from the degree of irregularity detected by said means for detecting a degree of irregularity, and calculates the adjustment value corresponding to the damping force of said suspension devices on the basis of the irregularity component.

* * * * *